(12) United States Patent
Shirota et al.

(10) Patent No.: US 10,353,454 B2
(45) Date of Patent: Jul. 16, 2019

(54) INFORMATION PROCESSING APPARATUS AND COMPUTER PROGRAM PRODUCT FOR CHANGING SWAP SPACES BASED ON A PERFORMANCE THRESHOLD

(71) Applicant: TOSHIBA MEMORY CORPORATION, Minato-ku (JP)

(72) Inventors: Yusuke Shirota, Yokohama (JP); Tatsunori Kanai, Yokohama (JP); Shiyo Yoshimura, Kawasaki (JP); Satoshi Shirai, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 97 days.

(21) Appl. No.: 15/419,044

(22) Filed: Jan. 30, 2017

(65) Prior Publication Data
US 2017/0228012 A1  Aug. 10, 2017

(30) Foreign Application Priority Data
Feb. 4, 2016  (JP) ................................ 2016-020117

(51) Int. Cl.
*G06F 3/06* (2006.01)
*G06F 1/3234* (2019.01)
(Continued)

(52) U.S. Cl.
CPC .............. *G06F 1/3275* (2013.01); *G06F 1/08* (2013.01); *G06F 1/324* (2013.01); *G06F 1/329* (2013.01);
(Continued)

(58) Field of Classification Search
CPC ...... G06F 3/061; G06F 3/0611; G06F 3/0625; G06F 1/3275; G06F 1/324; G06F 1/3296; G06F 3/0644; G06F 3/0646
See application file for complete search history.

(56) References Cited

U.S. PATENT DOCUMENTS 8,854,388 B2  10/2014  Ishikawa
2011/0099339 A1*  4/2011  Hagiwara .............. G03G 15/50
                                                              711/154

(Continued)

FOREIGN PATENT DOCUMENTS

JP         2010-3076         1/2010

*Primary Examiner* — Than Nguyen
(74) *Attorney, Agent, or Firm* — Oblon, McClelland, Maier & Neustadt, L.L.P.

(57) ABSTRACT

According to an embodiment, an information processing apparatus includes a processing device, a first memory, a second memory, and a controller. The processing device is configured to process first data. The first memory is configured to store at least part of the first data and has an active region supplied with power necessary for holding data. The second memory is configured to store part of the first data. The controller is configured to change number of active regions such that processing information is not more than a threshold. The processing information indicates an amount of processing for moving at least part of second data stored in the first memory to the second memory and for moving at least part of third data stored in the second memory to the first memory, in a certain period for processing the first data having a size larger than active regions.

26 Claims, 34 Drawing Sheets

(51) Int. Cl.
*G06F 1/08* (2006.01)
*G06F 1/3296* (2019.01)
*G06F 1/324* (2019.01)
*G06F 1/329* (2019.01)

(52) U.S. Cl.
CPC .......... *G06F 1/3296* (2013.01); *G06F 3/0625* (2013.01); *G06F 3/0644* (2013.01); *G06F 3/0646* (2013.01); *Y02D 10/126* (2018.01); *Y02D 10/14* (2018.01); *Y02D 10/24* (2018.01)

(56) References Cited

U.S. PATENT DOCUMENTS

2012/0284475 A1* 11/2012 Zaarur .................. G06F 1/3275
711/165
2015/0339059 A1* 11/2015 Kang .................... G06F 12/023
711/154
2017/0228155 A1* 8/2017 Shirota .................. G06F 3/061

\* cited by examiner

INFORMATION PROCESSING APPARATUS AND COMPUTER PROGRAM PRODUCT FOR CHANGING SWAP SPACES BASED ON A PERFORMANCE THRESHOLD

CROSS-REFERENCE TO RELATED APPLICATION

This application is based upon and claims the benefit of priority from Japanese Patent Application No. 2016-020117, filed on Feb. 4, 2016; the entire contents of which are incorporated herein by reference.

FIELD

Embodiments of the present invention relate to an information processing apparatus and a computer program product.

BACKGROUND

Conventionally there is a known technique that allows data exceeding the capacity of a main memory such as dynamic random access memory (DRAM) to be stored into a space (which may be referred to as a swap file) reserved in a storage (for example, HDD or SSD) other than the main memory to run an application while executing swapping (data moving processing) including moving a page from the main memory to swap space (page-out) and moving a page from swap space to the main memory (page-in).

When such swapping takes place, the speed performance of the application is significantly reduced or becomes unstable (becomes difficult to predict). Systems therefore are usually designed to include a large-capacity memory to ensure a sufficient size of main memory in order to minimize swapping.

Unfortunately, in the conventional technique, electric power that is necessary for at least holding the content of the stored data is kept supplied to all the regions in the large-scale main memory, which makes it difficult to save power consumed by the main memory. On the other hand, reducing the size of the main memory in favor of power saving, in turn, significantly reduces the speed performance of the application running on the processor. Accordingly, it has been difficult to save power while ensuring the speed performance of the application running on the processor.

DETAILED DESCRIPTION

Figure 1:
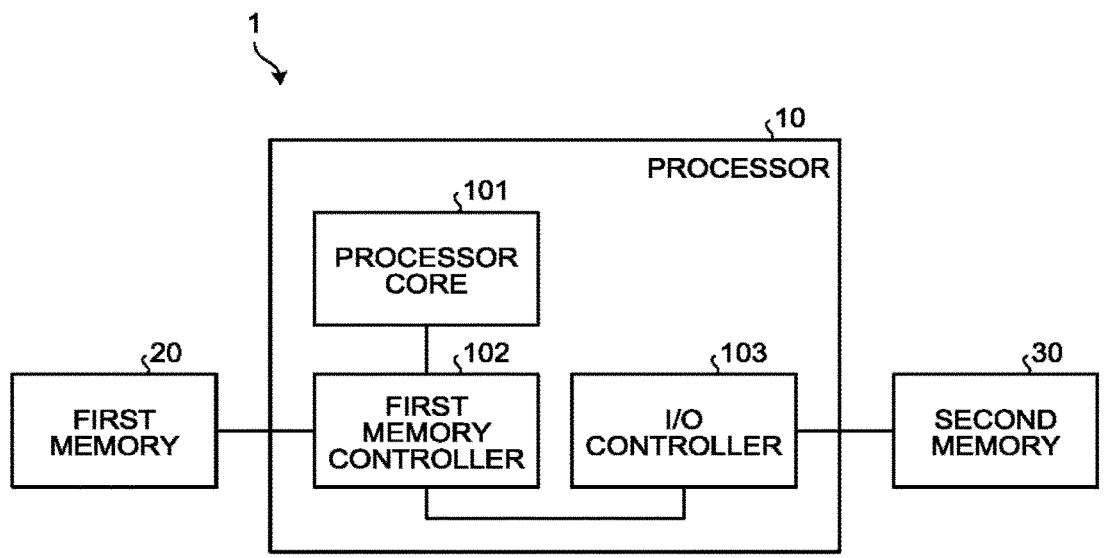
FIG. 1 is a diagram illustrating an exemplary configuration of an information processing apparatus according to a first embodiment.

According to an embodiment, an information processing apparatus includes a processing device, a first memory, a second memory, and a region controller. The processing device is configured to process first data. The first memory is configured to store at least part of the first data. The first memory has an active region supplied with first power that is necessary for at least holding content of data. The second memory is configured to store part of the first data. The region controller is configured to change number of active regions such that processing information is equal to or smaller than a threshold. The processing information indicates an amount of processing for moving at least part of second data indicating data stored in the first memory to the second memory and for moving at least part of third data indicating data stored in the second memory to the first memory, in a certain period in a period for processing the first data having a size larger than one or more active regions.

Embodiments of an information processing apparatus and a computer program product according to the present invention will be described in details below with reference to the accompanying drawings.

First Embodiment

Prior to a description of the details, an overview of the present embodiment will be described in conjunction with related arts. In computer systems, it is necessary to provide large-capacity memory space (address space) for applications performing large-scale data processing. Swapping using the virtual memory scheme of the operating system (OS) such as Linux (registered trademark) can provide an application (process) with a virtual address space larger than the size of the main memory (for example, DRAM) to allow the OS to run an application that requires a memory size (space in which data is stored) exceeding the capacity of the main memory (physical memory) configured with DRAM.

In the OS virtual memory system, a virtual address specified by the application is mapped (allocated) to a physical address (information indicating the location of memory). The mapping is performed using a page table that stores therein the correspondence in units of pages (hereinafter simply referred to as "page") managed by the OS. In the swapping provided by the swapping mechanism of the virtual memory system, a page not mapped to the main memory (page not existing on the DRAM) is stored into space ("swap space") reserved in a storage different from the main memory, such as a hard disk drive (HDD) or a solid state drive (SSD), and the application is run while the swapping as described above is performed. In this way, swapping using a device such as HDD or SSD as a swap device having a swap space reserved therein makes the main memory configured with DRAM appear as if a large and fast main memory exists as a region for storing therein data processed by applications (working region for performing processing).

However, in storage devices such as SSD and HDD, the access speed (access latency) indicating a data read/write speed is slow. Therefore, when these devices are used as a swap device and swapping (the process of transferring data from the swap device to the main memory and transferring data from the main memory to the swap device) occurs, data transfer between the main memory and the SSD or data transfer between the main memory and the HDD significantly reduces the speed performance of the application. A possible solution to this problem is to suppress unnecessary data transfer between the main memory and the swap device and thereby prevent performance degradation. Since the occurrence of swapping makes the speed performance of the application unstable (difficult to predict), systems are usually designed to ensure a sufficient size of the main memory so as to minimize swapping.

Low power consumption is an important issue in a wide variety of computer systems ranging from server systems such as clouds and data centers having applications to run for large-scale data processing to increasingly sophisticated mobile systems such as smartphones. For power saving in these systems, it is particularly important to reduce power consumed by DRAM used for the main memory.

The present embodiment then provides a new virtual memory scheme that actively utilizes swapping in order to run applications fast with low power consumption, by taking advantage of high speed performance of large-capacity high-speed nonvolatile memory such as MRAM, PCM, 3D XPoint, and ReRAM. The present embodiment, of which details will be described later, dynamically reduces the capacity of DRAM (main memory) available in a computer system (OS or application) and powers off (stops power supply) a region of the DRAM that is not mapped with a page (region not used as a working region for an application), thereby reducing standby power more than when a low power consumption mode such as self-refresh is used. This scheme can save power consumed in computer systems/information processing apparatuses including high-performance systems equipped with DRAM, such as servers and supercomputers, smartphones, tablet computers, wearable computers, on-vehicle systems, and built-in systems for IoT/M2M. As will be described with other embodiments later, systems capable of saving more power can be constructed by completely removing DRAM from the systems.

As a swap device, a large-capacity high-speed nonvolatile memory (hereinafter referred to as "NVM") may be used, which is also called SCM as described in Japanese Patent Application Laid-open No. 2010-3076, with a speed equivalent to or slightly slower than DRAM (main memory) but faster than storages such as SSD and HDD, and with a larger capacity than DRAM. The use of such an NVM enables fast data transfer in swapping and prevents a sharp decrease in speed performance of the application even when swapping is actively performed to some extent. In the present embodiment, this large-capacity high-speed nonvolatile memory is used to construct a computer system capable of saving power while keeping speed performance.

Specific contents of the present embodiment will now be described below. FIG. 1 is a diagram illustrating an example of the hardware configuration of an information processing apparatus 1 according to the present embodiment. As illustrated in FIG. 1, the information processing apparatus 1 includes a processor 10, a first memory 20, and a second memory 30.

The processor 10 is an example of "processing device" and is a device for executing a variety of processing. In this example, the processor 10 is a processor such as the Intel XEON processor and has a plurality of processor cores 101 (for convenience of explanation, only one processor core 101 is illustrated in FIG. 1). Each processor core 101 has private caches such as L1 data cache, L1 instruction cache, and L2 cache (not illustrated). In addition, a last level cache (LLC) such as L3 cache, located at the lowest level in the cache hierarchy, is shared among the processor cores 101. Although the following description is premised on such a configuration, embodiments are not limited to such a configuration and may be configured with a single processor system.

Figure 2:
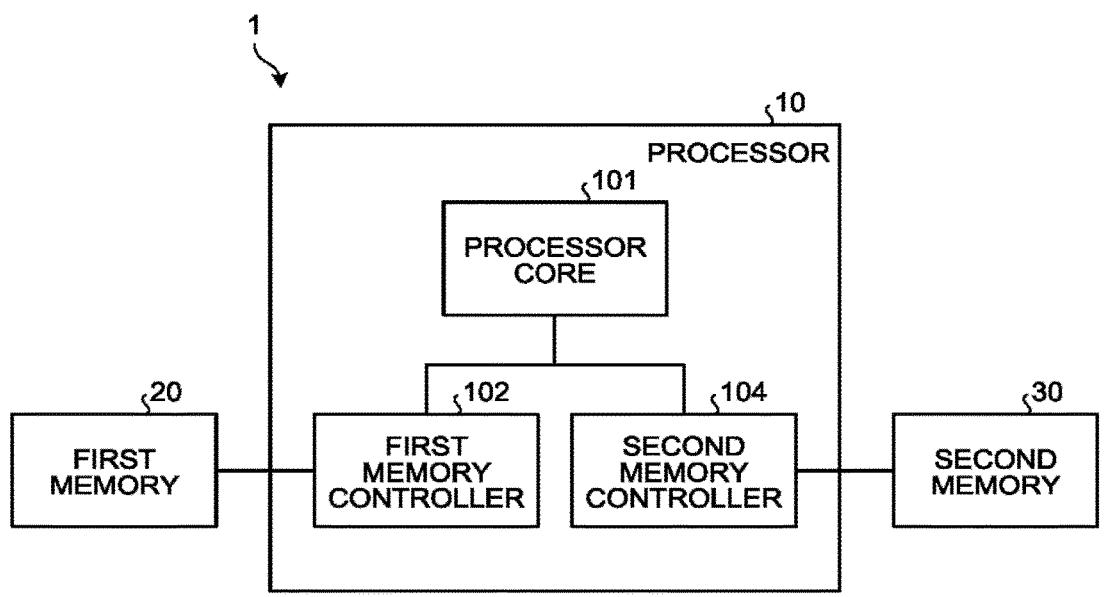
FIG. 2 is a diagram illustrating an exemplary configuration of an information processing apparatus according to a modification.

The processor 10 contains a first memory controller 102 (in this example, DRAM controller), through which the first memory 20 (in this example, DRAM) is connected (memory bus connection). The processor 10 contains an I/O controller 103 (I/O adapter), through which the second memory 30 (in this example, NVM) is connected (I/O bus connection). Embodiments are not limited to this configuration, and for example, as illustrated in FIG. 2, the processor 10 may contain a second memory controller 104 (in this example, NVM controller), through which the second memory 30 may be connected (memory bus connection). In any case, data transfer between the first memory 20 and the second memory 30 may be performed by the processor core 101 or may be performed by hardware dedicated to data transfer (DMA controller). The connection method between the second memory 30 and the processor 10 as well as the implementation form of the second memory 30 can be set as desired.

The first memory 20 functions as a main memory (main storage device), and the processor 10 directly reads/writes data on the first memory 20. For example, the processor 10 processes first data, where the "first data" is data (which may be considered as a data set of any given size) processed by any given application (process, for convenience of explanation, referred to as "first processing") running on the processor 10. More specifically, the processor 10 executes the first processing of processing the first data. The first memory 20 is a memory storing therein at least part of the first data and is configured with DRAM in this example.

The first memory 20 includes a plurality of DIMMs (regions serving as units of power supply (power supply unit regions)) built with DRAM chips. The DIMM includes a plurality of ranks (each rank includes a plurality of banks). In the following, a state in which the first memory 20 is in a low power consumption mode such as a self-refresh mode or is powered-off (power supply is stopped) may be referred to as a low power consumption state. The settings of the low power consumption state can be finely controlled in units of DIMMs, ranks, or banks. The first memory 20 may be partially or entirely replaced with a high-speed nonvolatile memory for main memory, such as a magnetoresistive random access memory (MRAM).

The second memory 30 is a memory in which swap space is reserved and is configured with NVM in this example. The second memory 30 can be considered as a memory storing therein part of the first data. The second memory 30 configured with, for example, NVM is a large-capacity high-speed nonvolatile memory (or a large-capacity low power consumption memory) connected to the processor 10. In general, the access speed (data read/write speed) of NVM is equivalent to or slightly slower than DRAM but NVM has a capacity larger than DRAM (or may have a capacity equivalent to DRAM), and NVM consumes no or very low power during standby because it is nonvolatile. For example, the NVM as the second memory 30 may be configured with MRAM or may be configured with, but not limited to, phase change memory (PCM), 3D XPoint, resistive random access memory (ReRAM), ferroelectric random access memory (FeRAM), or Memristor. The second memory 30 is supposed to be, but not limited to, a memory with an access speed of about 10 ns to a few µs and with lower power to hold data compared with the first memory 20 (typically a nonvolatile memory, but may be a volatile memory). For example, the access speed may be faster or slower than 10 ns to a few µs. Alternatively, the second memory 30 may be a byte-addressable memory or a memory with larger units of data read/write (access).

The second memory 30 (part or whole of the second memory 30) is used as a swap device (device in which swap space is reserved) in swapping using the virtual memory scheme of the operating system (OS) such as Linux operating on the processor 10. Thus, when target data indicating data to which access (data read/write) is requested exists in the second memory 30, swapping using the virtual memory scheme of the OS operating on the processor 10 allows a page on the first memory 20 (data of a size in a unit of swapping) to be transferred to the second memory 30 and allows the page including the target data on the second memory 30 to be transferred to the first memory 20, and thereafter the page transferred from the second memory 30 is read/written. The transfer from the first memory 20 to the second memory 30 and the transfer from the second memory 30 to the first memory 20 are performed in any order and at any timing. For example, in an implementation, a plurality of pages on the first memory 20 not recently used may be collectively transferred to the second memory 30 at any given timing in advance to free the first memory 20, so that a page including target data on the second memory 30 can be transferred to the first memory 20 immediately when required. This is applicable to the following embodiments.

By taking the advantage of the high speed performance of the second memory 30 (in this example, NVM), the information processing apparatus 1 configured as described above dynamically changes the number of one or more active regions indicating regions supplied with first power that is necessary for at least holding the content of data in the first memory 20 available to the OS or application (the size of the region capable of data read/write in the first memory 20 is dynamically changed). Here, an region other than the active region in the first memory 20 is referred to as "inactive region", and second power supplied to the inactive region is lower than the first power (for example, may be zero by power-off). When the number of active regions is reduced (the active capacity of DRAM is reduced), the application needs to be executed with a smaller number of active regions as working regions, and the number of times of swapping increases. Although the increased number of times of swapping reduces the performance of the application, the performance degradation is gradual compared with when HDD or SSD is used as a swap device, because of the high speed performance of the second memory 30. Therefore, by actively reducing the number of active regions to a limit in which performance degradation is permitted (reducing the active capacity of DRAM), power consumption of the first memory 20 for, for example, holding the content of data such as self-refresh is reduced to achieve power saving.

An example will now be described with reference to FIG. 3 and the like. As a premise, the application running on the processor 10 runs using the region 3 (region 3 serving as an active region) of the first memory 20 supplied with first power and the swap space on the second memory 30 provided by the virtual memory of the OS, as working memory (first state in FIG. 3). In the example in FIG. 3, the memory size necessary for running the application is larger than the size of the region 3. In other words, the size of the first data indicating data processed by the application (first processing) (the total size of all data processed by the application) is larger than the size of the region 3. Therefore, when data (target data) requested for read/write does not exist in the region 3 but exists in the second memory 30 during operation of the application, for example, a page not used for a time equal to or longer than a predetermined value is selected from among the pages included in the region 3, and swapping is performed to purge the selected page to the second memory 30 and transfer a page including target data in the second memory 30 to the first memory 20. In other words, pages are exchanged between the region 3 of the first memory 20 and the second memory 30.

Although here, for convenience of explanation, the first memory 20 is divided into three regions, embodiments are not limited to this configuration. The first memory 20 is configured with any number of regions (power supply unit regions) such as DIMMs, ranks, or banks. Similarly, although here the initial value of the active (available to the OS or the application) capacity of the first memory 20 is ⅓ of the entire size of the first memory 20 (in other words, the initial value of the number of active regions is ⅓ of the total number of power supply unit regions included in the first memory 20), the initial value may be set as desired. For example, the size of the first memory 20 initially available (the number of active regions) may be ¹⁄₁₀ of the size of the entire first memory 20 or may be ¹⁄₁₀ of the size necessary for running the application (for example, the memory size to be reserved).

Power (first power) supplied to the region 3 is set to power that enables memory access (power that is necessary for at least holding the content of data). In the first state in FIG. 3, the region of the first memory 20 that is available to the OS or the application is the region 3 alone, and power supplied to each of the region 1 and the region 2 is set to the second power (typically zero) lower than the first power. Each of the region 1 and the region 2 is in a state not available to the OS and the application.

As a premise, a threshold is set in the OS. This threshold is a value indicating the reference of a permissible range of performance degradation of the execution time in a case where the application is executed by actively performing swapping using the second memory 30 as a swap device. The threshold is, for example, a value specified by the application running on the information processing apparatus 1 and is a value indicating a reference of the permissible range of degradation of the execution time in a case where the application is run while swapping is performed using, as working regions, the swap space and the first memory 20, which is small relative to the execution time in a case where it is supposed that the first memory 20 has a sufficiently large memory size and the application is executed with the first memory 20 alone. In other words, the threshold is a reference value indicating the permissible range of the degree of degradation of a second execution time indicating the whole or part of the execution time in the case where the first processing of processing the first data is executed using the first memory 20 and the second memory 30 (in short, executed by performing swapping), relative to a first execution time indicating the whole or part of the execution time in a case where the first processing is executed with the first memory 20 alone. For example, when up to 10% performance degradation is permitted relative to the first execution time T, the threshold is set, for example, as T×0.1. For example, when up to 10% performance degradation is permitted for a certain period of time T during execution of the first processing, the threshold is set, for example, as T×0.1. This threshold may be set for each application running on the information processing apparatus 1 or may be set to the same value for all applications (processes). This threshold may be, but not limited to, a value specified by the application or a predetermined value in the OS.

Figure 4:
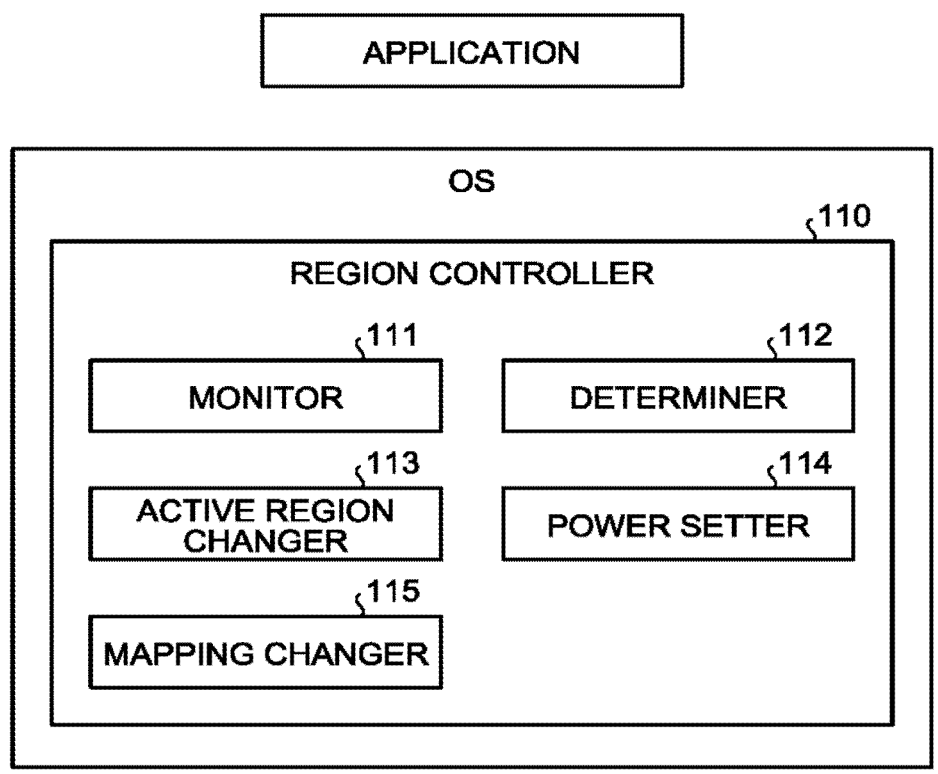
FIG. 4 is a diagram illustrating software of the information processing apparatus according to the first embodiment.

The processing of the information processing apparatus 1 for implementing lower power consumption by reducing the number of active regions (reducing the active size of the first memory 20) will now be described. FIG. 4 is a diagram illustrating an example of the software configuration of the information processing apparatus 1, in which the application and the OS exist as the software (computer programs) executed by the processor 10. The OS refers to a basic computer program for providing the function of controlling hardware resources of the information processing apparatus 1. The OS is, for example, Linux. The application refers to a computer program for providing a certain function using the OS and includes any type of applications. The processor 10 (processor core 101) can execute the OS and the application to implement a variety of functions. Here, the OS accepts an access request (data read request or write request) for data (process target data) processed by an application from the application and performs control in accordance with the accepted access request.

As illustrated in FIG. 4, the OS has a region controller 110. In other words, the function of the region controller 110 is provided by the OS. As described above, the active region is a region in the first memory 20 that is supplied with the first power that is necessary for at least holding the content of data. The region controller 110 changes the number of active regions such that processing information indicating the amount of processing for moving at least part of second data indicating data stored in the first memory 20 to the second memory 30 and moving at least part of third data indicating data stored in the second memory 30 to the first memory 20 is equal to or smaller than the threshold in a certain period, in a period for processing the first data having a size larger than one or more active regions. The "period for processing the first data" may be considered as a period during which the first data is being processed (application is running) or may be considered as a period from when an event for processing the first data occurs to when the processing of the first data is completed. The period for processing the first data may be considered as a period for executing the first processing (process) of processing the first data. In the following description, the processing for moving at least part of second data (data in units of pages) indicating data stored in the first memory 20 to the second memory 30 and moving at least part of third data (data in units of pages) indicating data stored in the second memory 30 to the first memory 20 is referred to as "swapping (moving processing)". In this example, swapping occurs when data requested for read/write (target data) in the first data exists in the second memory 30. Among pages included in the first memory 20, a page not used for a time equal to or longer than a predetermined value or a page not used for a longer time than other pages is purged as the second data to the second memory 30, and a page including target data in the second memory 30 is transferred as the third data to the first memory 20.

The above-noted processing information is information indicating the time required for one or more swapping processes (moving processing) occurring in a certain period of time. The time required for one swapping process (which hereinafter may be referred to as "overhead") is the sum of the time (hereinafter may be referred to as "data transfer time") required for data transfer between the first memory 20 and the second memory 30 (transfer of each of the second data and the third data) and the time (hereinafter may be referred to as "OS processing time") required for the processing executed by the OS in connection with swapping. The OS processing time refers to the total time required for swapping except the data transfer time, such as the context switching in the OS, the processing of the device driver of the I/O controller 103, the processing of deciding which page is to be transferred to the second memory 30, and the operation of referring to or changing mapping in the page table of the OS. What is included in this OS processing time varies depending on implementations. It is needless to say that the context processing in the OS may not occur in some implementations, and all of the examples listed above are not necessarily included. The processing listed above is illustrated only by way of example, and embodiments are not limited thereto. Here, the processing information is represented by swapping overhead indicating the sum of respective overheads of one or more swapping processes occurring in a certain period of time. In this example, the region controller 110 performs control to increase the number of active regions when the processing information is greater than a threshold.

In the present embodiment, as illustrated in FIG. 4, the region controller 110 includes a monitor 111, a determiner 112, an active region changer 113, a power setter 114, and a mapping changer 115. The monitor 111 monitors the swapping between the first memory 20 and the second memory 30 that occurs in a certain period during operation of the application. The determiner 112 determines whether the swapping overhead indicating the time required for one or more swapping processes monitored by the monitor 111 is greater than a threshold.

The active region changer 113 changes the number of active regions when the determiner 112 determines that the swapping overhead is greater than a threshold. More specifically, the active region changer 113 performs control to increase the number of active regions by "1". In this example, the active region changer 113 instructs the power setter 114 to change power supplied to any one of one or more inactive regions indicating power supply unit regions supplied with the second power, of a plurality of power supply unit regions included in the first memory 20, from the second power to the first power. The power setter 114 receiving this instruction changes power supplied to any one of the inactive regions from the second power to the first power. It is now assumed that the determiner 112 determines that the swapping overhead is greater than a threshold in the first state illustrated in FIG. 3. In this case, the active region changer 113 instructs the power setter 114 to change power supplied to the region 2 from the second power to the first power. The power setter 114 receiving this instruction changes power supplied to the region 2 from the second power to the first power (the second state illustrated in FIG. 3). The number of active regions is thus increased by "1".

The increase of the number of active regions (increase of the active capacity of the first memory 20) reduces the occurrence frequency of swapping and also reduces the swapping overhead. The number of active regions to be increased at a time is not limited to "1" but may be any number.

When the number of active regions is reduced as will be described later, the mapping changer 115 moves the page mapped to the target active region (the active region to be changed to an inactive region) to another active region or to the second memory 30 and changes a page table indicating the correspondence between the virtual address specified by the application and the physical address (information indicating the position in the memory) in units of pages, together with the moving of the page.

Figure 5:
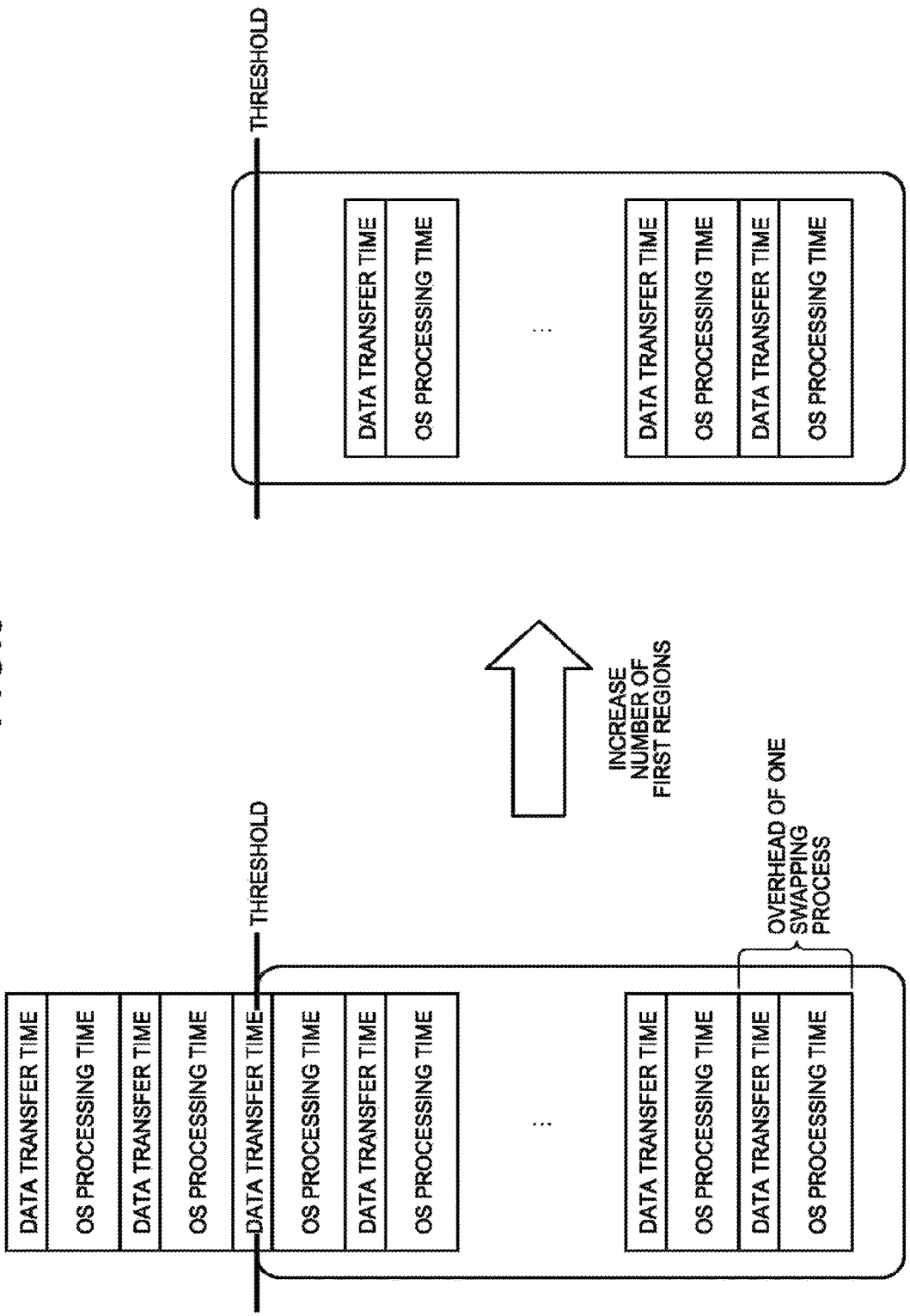
FIG. 5 is a diagram illustrating overhead of swapping in the first embodiment.

The overhead monitored by the monitor 111 will now be described with reference to FIG. 5. As described above, the monitor 111 monitors one or more swapping processes occurring in a certain period during operation of the application and obtains the overhead for each swapping process. As illustrated in FIG. 5, the overhead for one swapping is the sum of the data transfer time and the OS processing time.

For example, when the data transfer time is 10 μs and the OS processing time is 100 μs, the overhead for one swapping process is 110 μs. The values of the data transfer time and the OS processing time may be measured by the OS (monitor 111) to obtain the total value every time swapping occurs, or the approximate values obtained through calculation may be used. The values necessary for calculation may be set in advance in the OS. For example, at any timing before the application is executed, for example, during installation of the OS or during start up, the data transfer time and the OS processing time taken for swapping may be measured in advance (preliminarily measured). Then, the number of times of swapping during a certain period is observed. Supposing that the number of times of swapping is N, the data transfer time for each swapping is the same (10 ρs set in the OS), and the OS processing time for each swapping is also the same (100 μs set in the OS), then the swapping overhead during a certain period can be calculated, for example, by N×(100 μs+10 μs).

The threshold and the form of the processing information are not limited to those described above. The threshold is any reference value for determining that any further increase of swapping increases performance reduction of the application and the system. The processing information may be information indicating the number of times of swapping occurring in the certain period. In this case, the number of times N of swapping is compared with the threshold (in this case, the upper limit value of the number of times of swapping) preset in the OS. For example, the processing information may be the amount of data transfer occurring in the certain period (the cumulative value of the amount of data transfer in a certain period). In this case, the observed amount of data transfer is compared with the threshold preset in the OS (the upper limit value of the amount of data transfer). The swapping overhead, the number of times of swapping, the amount of data transfer, and the like may be observed for one application or may be observed for the entire system (without distinction of a plurality of applications or processes simultaneously running on the processor). Since the processing information varies among applications according to the size of working set or the access amount, the number of active regions of the first memory 20 is changed according to applications. Specifically, it can be observed that the number of active regions of the first memory 20 (that is, the number of inactive regions) is changed between when a first application is being executed and when a second application is being executed, and in addition, a reduction of the execution time at that time is suppressed to a predetermined value or smaller. Since the workload (the number or the combination of applications in execution) always varies in data centers and the like, it is important to change the number of active region of the first memory 20 in accordance with the workload. In short, the processing information may be any information that indicates the amount of processing of swapping (moving processing).

The threshold is any reference value for determining that any further increase of swapping increases performance reduction of the application and the system. The performance of the system includes power consumption, as a matter of course. Reducing the active regions of the first memory 20 and powering off the reduced active region reduces the standby power of the first memory 20 and, meanwhile, increases the amount of processing of swapping (moving processing) to increase the amount of electric power for accessing the first memory 20 and the amount of electric power for accessing the second memory 30, accordingly. In other words, when the active regions of the first memory 20 are reduced one by one, there is a trade-off between the power reduced by powering off one active region of the first memory 20 and the power for memory access increased accordingly. Thus, the threshold may be the amount of electric power in a certain period that can be reduced by reducing one active region of the first memory 20 and changing power from the first power to the second power (power during power-off). The processing information is the sum of the amount of electric power for accessing the first memory 20 and the amount of electric power for accessing the second memory 30 due to swapping (moving processing) increased in a certain period by reducing one active region. They are compared with each other, and if equal to or smaller than the threshold (that is, if more power can be reduced by reducing the active regions of the first memory 20 by one and increasing swapping), the active regions of the first memory 20 are reduced by one. In other words, the threshold may represent the amount of electric power reduced when power supplied to any one of active regions is changed from the first power to the second power that is lower than the first power and the number of active regions is reduced by one in a certain period. The processing information may be the amount of electric power produced along with the amount of processing (the amount of processing of swapping) increased in a certain period when the number of active regions is reduced by one. The region controller 110 can repeatedly execute the control to change power supplied to any one of active regions from the first power to the second power in a range in which the processing information is equal to or smaller than the threshold (the control to reduce the number of active regions by one). It is noted that the processing information, that is, the amount of electric power produced along with swapping (moving processing) increased in a certain period when the active regions are reduced by one, may be the one produced when the processing of direct read/write on the second memory 30 is mixed with the processing of read/write through transfer to the first memory 20 so as to reduce the amount of electric power as will be described later.

For example, in an embodiment, two thresholds may be used at the same time. For example, it is assumed that a second threshold is the overhead (time) of swapping permitted in a certain period as explained so far, and a third threshold is the amount of electric power that can be reduced by reducing the active regions of the first memory 20 by one and changing power from the first power to the second power (power during power-off). Then, when the active regions of the first memory 20 are reduced by one, if the second processing information related to the second threshold is equal to or smaller than the second threshold (that is, the reduction of speed performance is within a permissible range) and the third processing information related to the third threshold is equal to or smaller than the third threshold (that is, if power consumption that can be reduced by power-off is larger than an increase of power consumption by increased swapping), the active regions of the first memory 20 can be reduced by one. In other words, the second processing information represents the time (overhead) required for the moving processing occurring in a certain period, and the third processing information represents the amount of electric power produced (increased) along with the amount of processing (the amount of processing of swapping) increased in a certain period when the number of active regions is reduced by one. The region controller 110 may repeatedly execute the control to change power supplied to any one of active regions from the first power to the second power (the control to reduce the number of active regions by one) in a range in which the second processing information is equal to or smaller than the second threshold and the third processing information is equal to or smaller than the third threshold. The number of active regions reduced each time is not limited to one but may be any number.

Figure 6:
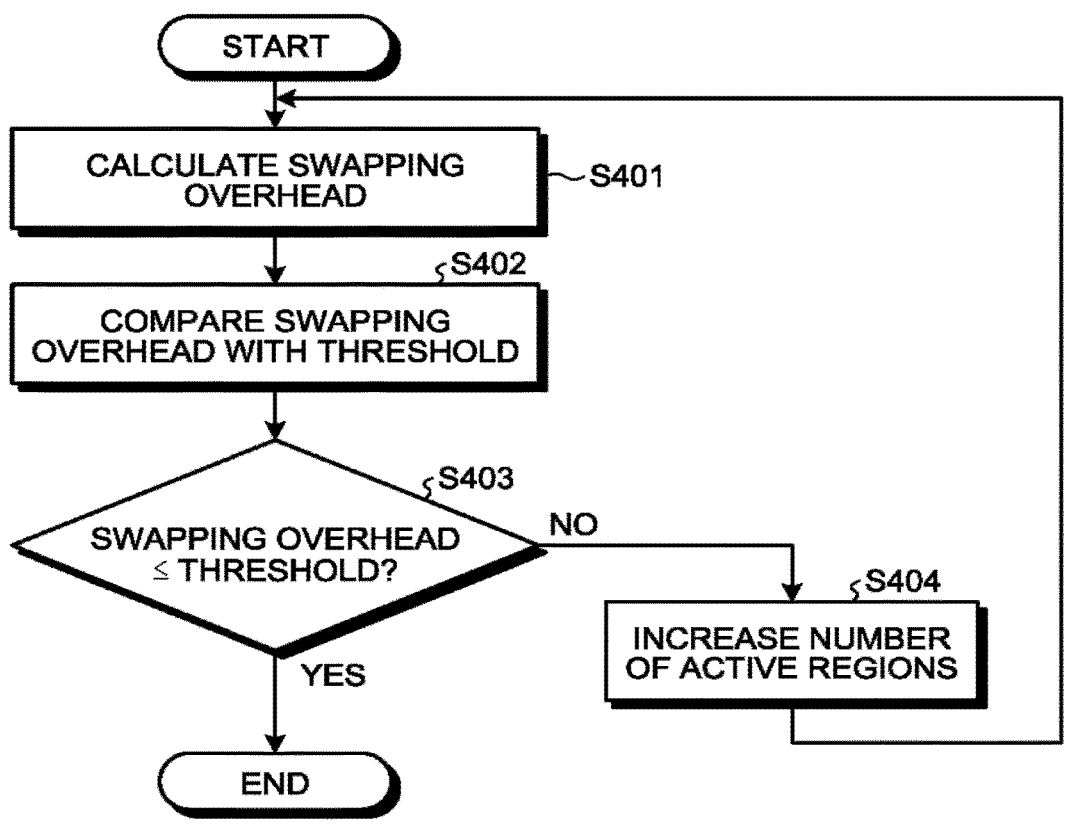
FIG. 6 is a diagram illustrating an operation example of the information processing apparatus according to the first embodiment.

FIG. 6 is a flowchart illustrating an operation example of the information processing apparatus 1. The specifics of each step are as described above.

As illustrated in FIG. 6, first of all, the region controller 110 (monitor 111) calculates the swapping overhead (step S401). Next, the region controller 110 (determiner 112) compares the swapping overhead calculated at step S401 with the threshold (step S402). If the swapping overhead is greater than the threshold (No at step S403), the region controller 110 (active region changer 113, power setter 114) performs the control to increase the number of active regions (step S404), and the processing subsequent to step S401 repeats. If the swapping overhead is equal to or smaller than the threshold (Yes at step S403), the processing ends.

The processing described above assumes that the initial value of the number of active regions of the first memory 20 (the initial value of the active capacity of the first memory 20) is set to a value smaller than the number required for running the application (for example, the number equivalent to the memory size allocated by the application), and that the number of active regions is dynamically increased when the swapping overhead exceeds the threshold. The processing, however, may be the reverse. Specifically, the number of active regions is dynamically reduced (for example, the second state in FIG. 3 is changed to the first state). Consequently, the number of active regions may be reduced within a range in which the performance reduction of the application is permitted, whereby power saving is achieved while the performance of the application is kept.

In other words, the region controller 110 may perform control to reduce the number of active regions in a range in which the processinlg information is equal to or smaller than the threshold. More specifically, the region controller 110 performs control to reduce the number of active regions when the processing information is equal to or smaller than a fourth threshold that is smaller than the above-noted threshold. The fourth threshold is a reference value for determining that the swapping overhead is sufficiently smaller than the threshold. As used herein, "sufficiently small" may be, for example, that the value of swapping overhead is equal to or smaller than ½ of the threshold.

To put it another way, the control is performed to reduce the number of active regions on the first memory 20 necessary for executing the first processing and reduce the number of active regions, such as power-off, by actively increasing swapping (actively purging a page on the first memory 20 to the second memory 30) in a range in which the swapping overhead is equal to or smaller than the threshold. Actively purging a page to the second memory 30 means "in a case where, of the pages included in the first memory 20, a page not used for a time equal to or longer than a predetermined value is purged as second data to the second memory 30, the predetermined value is set short", or "in a case where, of the pages included in the first memory 20, a page not used for a longer time than other pages is purged as second data to the second memory 30, the number of purged pages is increased", or "in a case where, of the pages included in the first memory 20, a predetermined number of pages are purged as second data to the second memory 30 at regular intervals, the interval is reduced", or "in a case where, of the pages included in the first memory 20, the pages other than a predetermined number of pages are purged as second data to the second memory 30, the number (the number of remaining pages) is reduced". In this manner, actively purging pages to the second memory 30 can reduce the necessary active regions on the first memory 20. Even when the number of times of swapping is actively increased in this way, the performance reduction can be suppressed since the NVM is fast. In short, the region controller 110 can perform control to increase the amount of processing (the amount of processing of swapping) in a range in which the swapping overhead (processing information) is equal to or smaller than the threshold to reduce the number of active regions necessary for processing the first data (necessary for performing the first processing), and to change power supplied to the unnecessary active region from the first power to the second power that is lower than the first power (that is, change to an inactive region).

Figure 3:
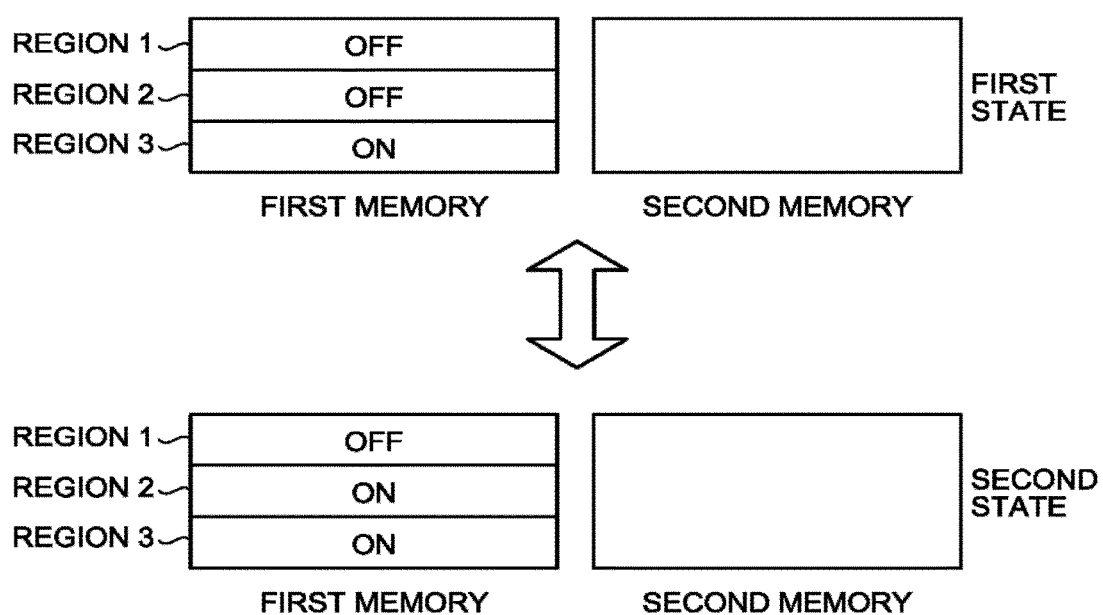
FIG. 3 is a diagram illustrating a specific example of the first embodiment.

Here, as a precondition, the application running on the processor 10 is running using, as working memory, the region 2 and the region 3 of the first memory 20 supplied with the first power and the swap space on the second memory 30 provided by the virtual memory of the OS (the second state in FIG. 3). The memory size necessary for running the application is larger than the total size of the region 2 and the region 3. The OS therefore executes the application while performing swapping in which necessary data is exchanged between the region 2 and the region 3 of the first memory 20 and the second memory 30. In this example, power (first power) supplied to each of the region 2 and the region 3 is set to power that is necessary for at least holding the content of the stored data (or power that enables memory access). In the second state in FIG. 3, the region of the first memory 20 that is available to the OS is the region 2 and the region 3, and power supplied to the region 1 is set to the second power (typically, zero) lower than the first power (for example, powered-off). The region 1 is in a state unavailable to the OS and the application (is an inactive region).

Figure 7:
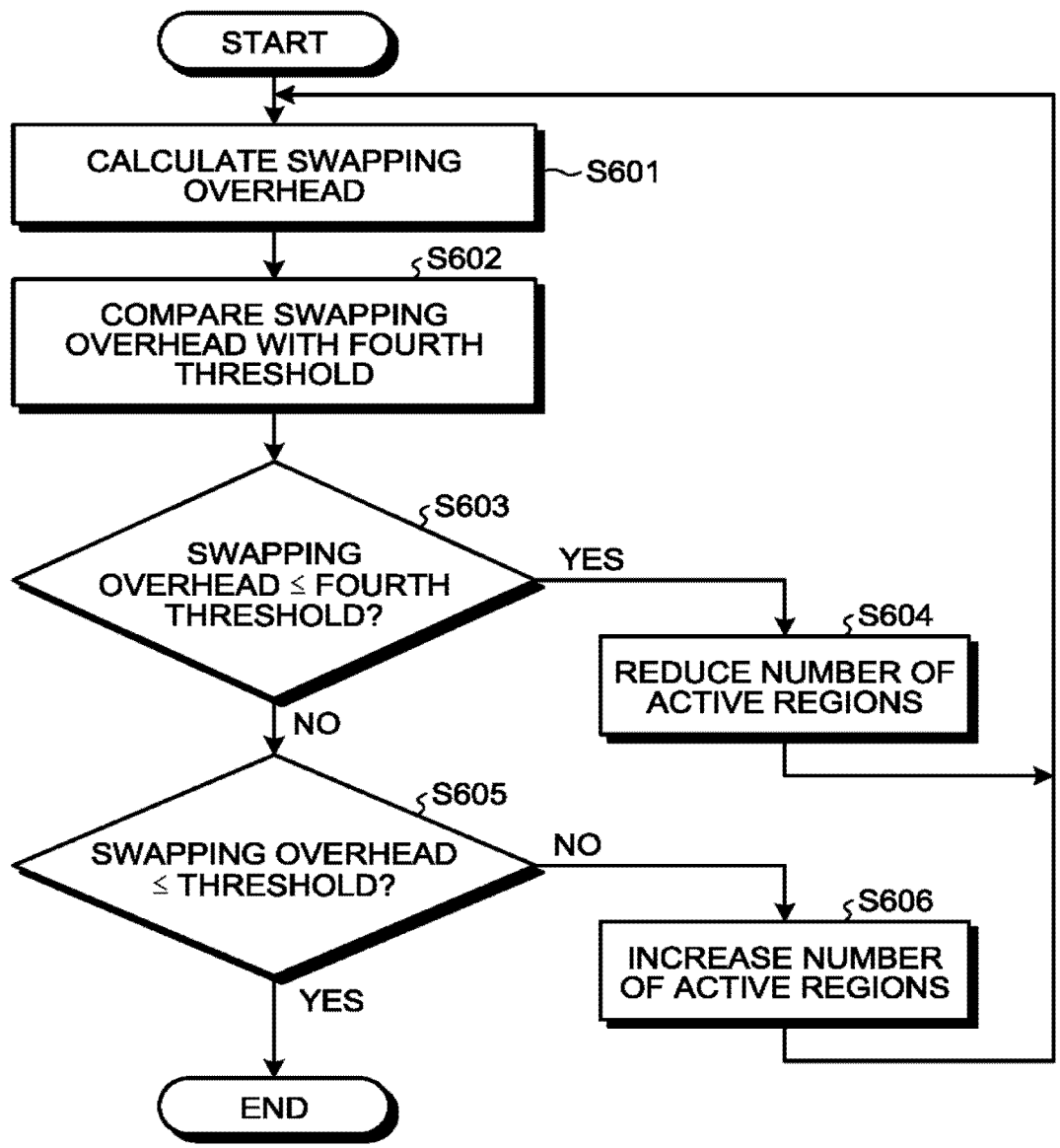
FIG. 7 is a diagram illustrating an operation example of the information processing apparatus according to the first embodiment.

FIG. 7 is a flowchart illustrating an operation example of the information processing apparatus 1 in this case. The processing at step S601 is the same as the processing at step S401 in FIG. 6. After step S601, the region controller 110 (determiner 112) compares the swapping overhead calculated at step S601 with the fourth threshold (step S602). If the swapping overhead is equal to or smaller than the fourth threshold (Yes at step S603), the region controller 110 (active region changer 113, power setter 114) performs control to reduce the number of active regions (step S604). For example, the active region changer 113 instructs the power setter 114 to change power supplied to the region 2 from the first power to the second power. The power setter 114 receiving this instruction changes power supplied to the region 2 from the first power to the second power (the first state illustrated in FIG. 3). The number of active regions is thus reduced by "1". At this moment, the region controller 110 also performs control to move data stored in the active region to be changed to an inactive region to the second memory 30. In this way, the reduction of the number of active regions (reduction of the active capacity of the first memory 20) results in increase in the occurrence frequency of swapping and increase in the swapping overhead. The processing subsequent to step S601 is then repeated. In short, when the processing information is equal to or smaller than the fourth threshold that is smaller than the aforementioned threshold, the region controller 110 may perform control to change power supplied to any one of the active regions from the first power to the second power that is smaller than the first power to reduce the number of active regions, and move data stored in the active region to the second memory 30.

If the swapping overhead is greater than the fourth threshold (No at step S603), the processing proceeds to step S605. The processing at step S605 and step S606 is the same as the processing at step S403 and step S404 illustrated in FIG. 6, and a detailed description thereof will be omitted.

It is noted that the appropriate active capacity of the first memory 20 varies depending on the memory access characteristic of the first processing (application). When the memory access frequency of the application is high (such an application is referred to as the second processing), the occurrence frequency of swapping is excessively increased if the number of active regions is excessively reduced. On the other hand, when the memory access frequency of the application is low (such an application is referred to as the third processing), the occurrence frequency of swapping is not extremely increased even when the number of active regions is actively reduced. In other words, the number of active regions differs between the second processing and the third processing by performing control to change the number of active regions such that the swapping overhead indicating the amount of processing of swapping occurring in a certain period in a period for executing the application is equal to or smaller than the threshold. When the second processing (memory access frequency is high) and the third processing (memory access frequency is low) are mixed in the first processing (one application), the number of active regions changes during execution of the first processing (one application).

As described above, in the present embodiment, the control is performed to change the number of active regions such that the swapping overhead indicating the amount of processing of swapping is equal to or smaller than a threshold in a certain period in a period for processing the first data having a size larger than one or more active regions. This control achieves power saving while ensuring the speed performance of the application running on the processor 10.

Modification to First Embodiment

Figure 8:
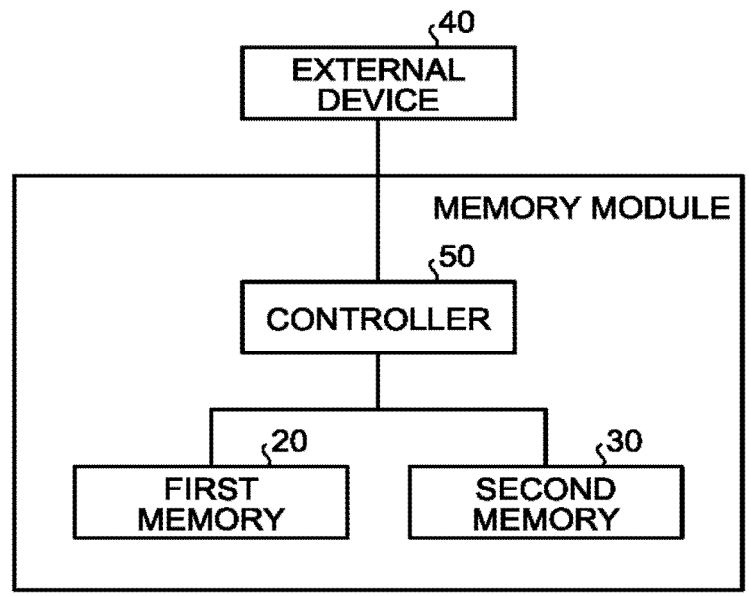
FIG. 8 is a diagram illustrating an exemplary configuration of an information processing apparatus according to a modification.

In an embodiment, for example, the virtual memory of the OS may not be used. For example, as illustrated in FIG. 8, a storage device (memory module) may be provided, which includes a first memory 20 used for read/write of the first data by an external device 40 executing the first processing of processing the first data, a second memory 30 on which the external device 40 cannot directly read/write data and that stores therein part of the first data, and a controller 50 for moving data (in this example, data in units of pages) between the first memory 20 and the second memory 30. It is preferable to provide hardware dedicated to data transfer (DMA controller) for moving data.

In the example in FIG. 8, the functions provided by the OS (the functions such as the region controller 110) are implemented by the controller 50 that is a hardware element. In this example, the controller 50 changes the number of active regions such that the processing information indicating the amount of processing of swapping is equal to or smaller than a threshold in a certain period in a period for processing the first data having a size larger than one or more active regions. When the processing information is greater than the threshold, the controller 50 may perform control to increase the number of active regions. Alternatively, the controller 50 may perform control to reduce the number of active regions in a range in which the processing information is equal to or smaller than the threshold. More specifically, when the processing information is equal to or smaller than the fourth threshold, the region controller 110 may perform control to reduce the number of active regions.

Second Embodiment

Figure 9:
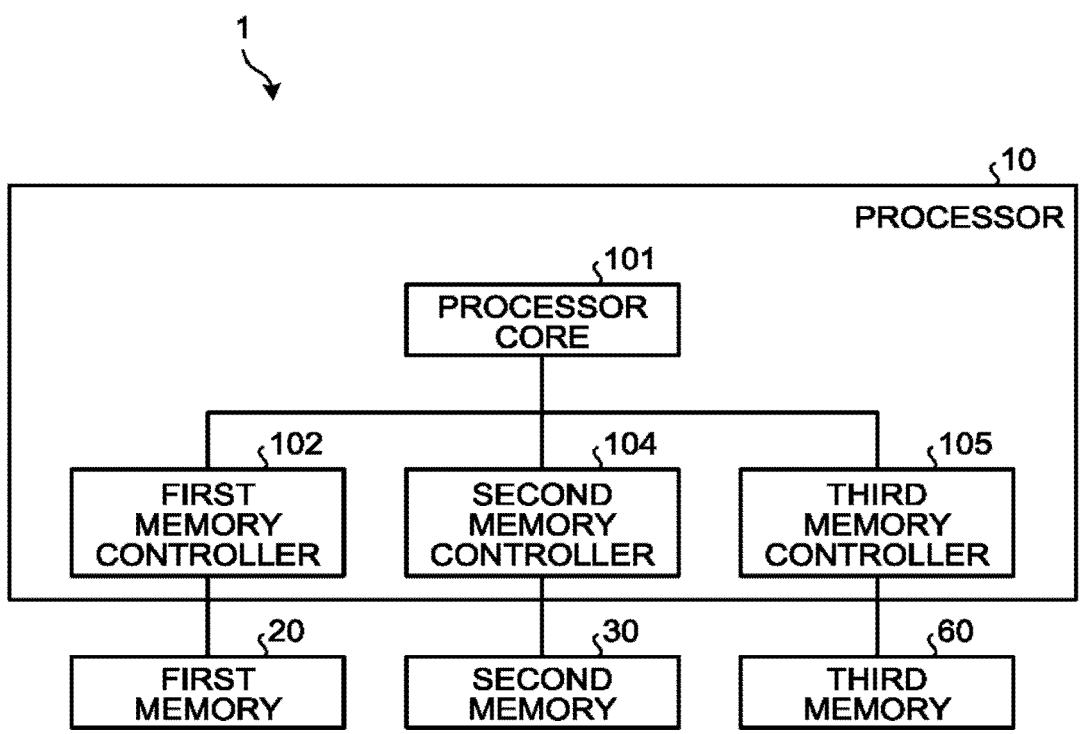
FIG. 9 is a diagram illustrating an exemplary configuration of an information processing apparatus according to a second embodiment.

A second embodiment will now be described. A description of parts in common with the foregoing first embodiment will be omitted as appropriate. FIG. 9 is a diagram illustrating an example of the hardware configuration of the information processing apparatus 1 according to the present embodiment. As illustrated in FIG. 9, the information processing apparatus 1 further includes a third memory 60 with an access speed, indicating the speed of data read/write, lower than that of the second memory 30. Although the third memory 60 is configured with NVM in this example, it may be configured with, for example, SSD or HDD. A combination of the second memory 30 and the third memory 60 may be changed as desired. The processor 10 contains a second memory controller 104 (in this example, NVM controller), through which the second memory 30 is connected (memory bus connection). The processor 10 further contains a third memory controller 105 (in this example, NVM controller), through which the third memory 60 is connected (memory bus connection). The SSD or HDD may be connected through an I/O controller, and the connection with the processor 10 may be in any form.

Here, the required performance may be satisfied (the swapping overhead is equal to or smaller than the threshold) even when the application is run using the third memory 60 as a swap device instead of the second memory 30. This is the case with, for example, when the number of times of swapping is relatively small. For example, this is the case when the memory access frequency of the application is low. In such a case, this application (first application) is run using the third memory 60 as a swap device, whereby the active capacity of the second memory 30 is freed accordingly so as to be used by another application (second application). If the second memory 30 can be used as a swap device by the second application alone, the memory bandwidth of the second memory 30 can be used solely by the second application, thereby reducing the data transfer time. If the data transfer time can be reduced, the required performance can be satisfied even when the number of times of swapping is increased. Therefore, the size of the first memory 20 (the number of active regions) can be further reduced, so that power consumption of the first memory 20 is further reduced, thereby achieving power saving.

Figure 10:
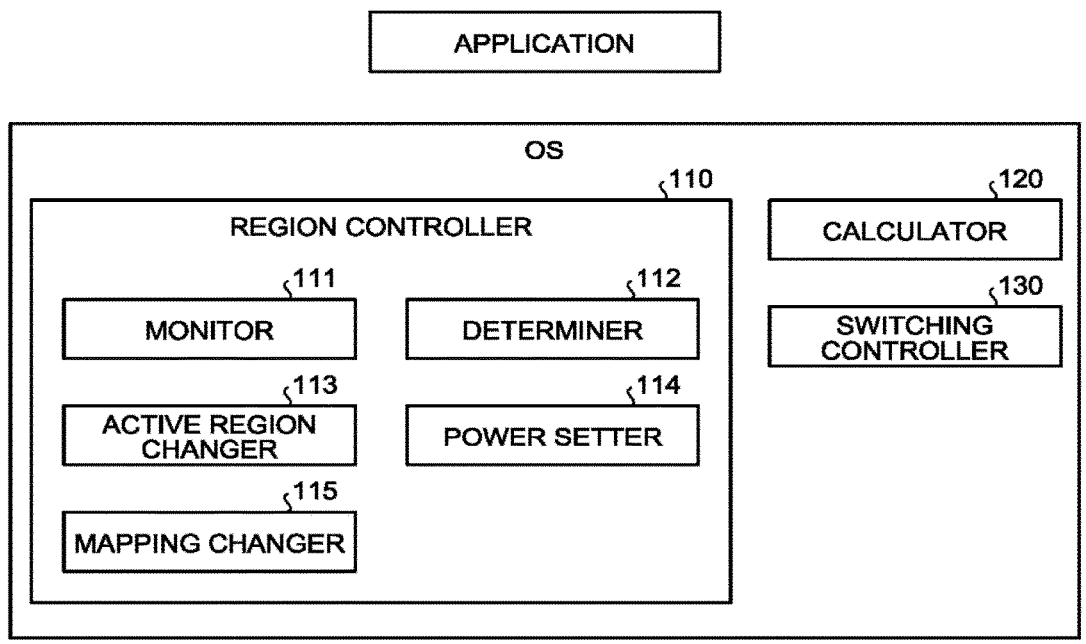
FIG. 10 is a diagram illustrating software of the information processing apparatus according to the second embodiment.

FIG. 10 is a diagram illustrating an example of the software configuration of the information processing apparatus 1 according to the present embodiment. As illustrated in FIG. 10, the OS further includes a calculator 120 and a switching controller 130.

The calculator 120 calculates second swapping overhead (fourth processing information) indicating the amount of processing in a case where the aforementioned swapping is replaced with second swapping (second moving processing) for moving the second data from the first memory 20 to the third memory 60 and moving the third data from the third memory 60 to the first memory 20, based on the aforementioned swapping overhead monitored by the monitor 111.

The switching controller 130 performs control to switch the corresponding processing (application) to the processing using the first memory 20 and the third memory 60 as working regions, when the second swapping overhead calculated by the calculator 120 is equal to or smaller than the aforementioned threshold.

Although the calculator 120 and the switching controller 130 are provided separately from the region controller 110 in this example, the embodiment is not limited to this configuration and, for example, the region controller 110 may include at least one of the calculator 120 and the switching controller 130.

Figure 11:
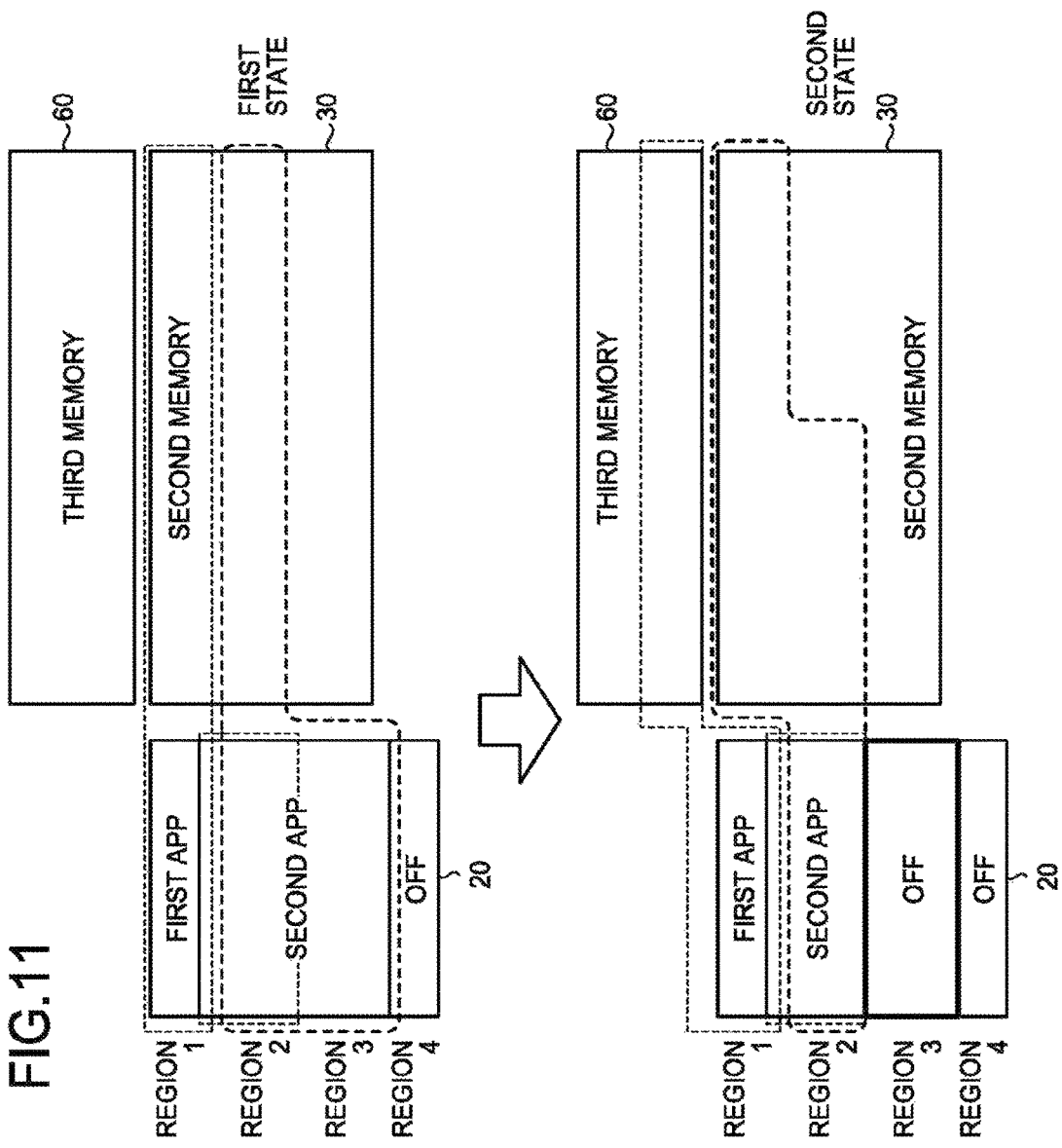
FIG. 11 is a diagram illustrating a specific example of the second embodiment.

Referring to FIG. 11, more details will be described. In FIG. 11, the first memory 20 is divided into four regions (region 1 to region 4), and the first application (denoted as "first App" in FIG. 11) and the second application (denoted as "second App" in FIG. 11) are running on the processor 10. The first application is an application running using the region 1 of the first memory 20 and the swap space on the second memory 30 and requiring a memory size larger than the region 1. The second application is an application running using the region 2 and the region 3 of the first memory 20 and the swap space on the second memory 30 and requiring a memory size larger than the sum of the region 2 and the region 3. In the first state in FIG. 11, the region of the first memory 20 that is available to the OS and the application is the region 1 to the region 3, and power supplied to the region 4 is set to the second power (typically, zero) lower than the first power. The region 4 is in a state unavailable to the OS or the application.

Here, the OS determines whether the required performance is satisfied even when the first application uses the third memory 60 as a swap device instead of the second memory 30 (whether the swapping overhead is equal to or smaller than the threshold). The determination is made as follows: the first application is run using the region 1 of the first memory 20 and the second memory 30, the swapping overhead indicating the time required for swapping occurring in a certain period is monitored, and based on this, the performance in a case where the first application is run using the region 1 of the first memory 20 and the third memory 60 is estimated to determine whether the required performance is kept satisfied.

Figure 12:
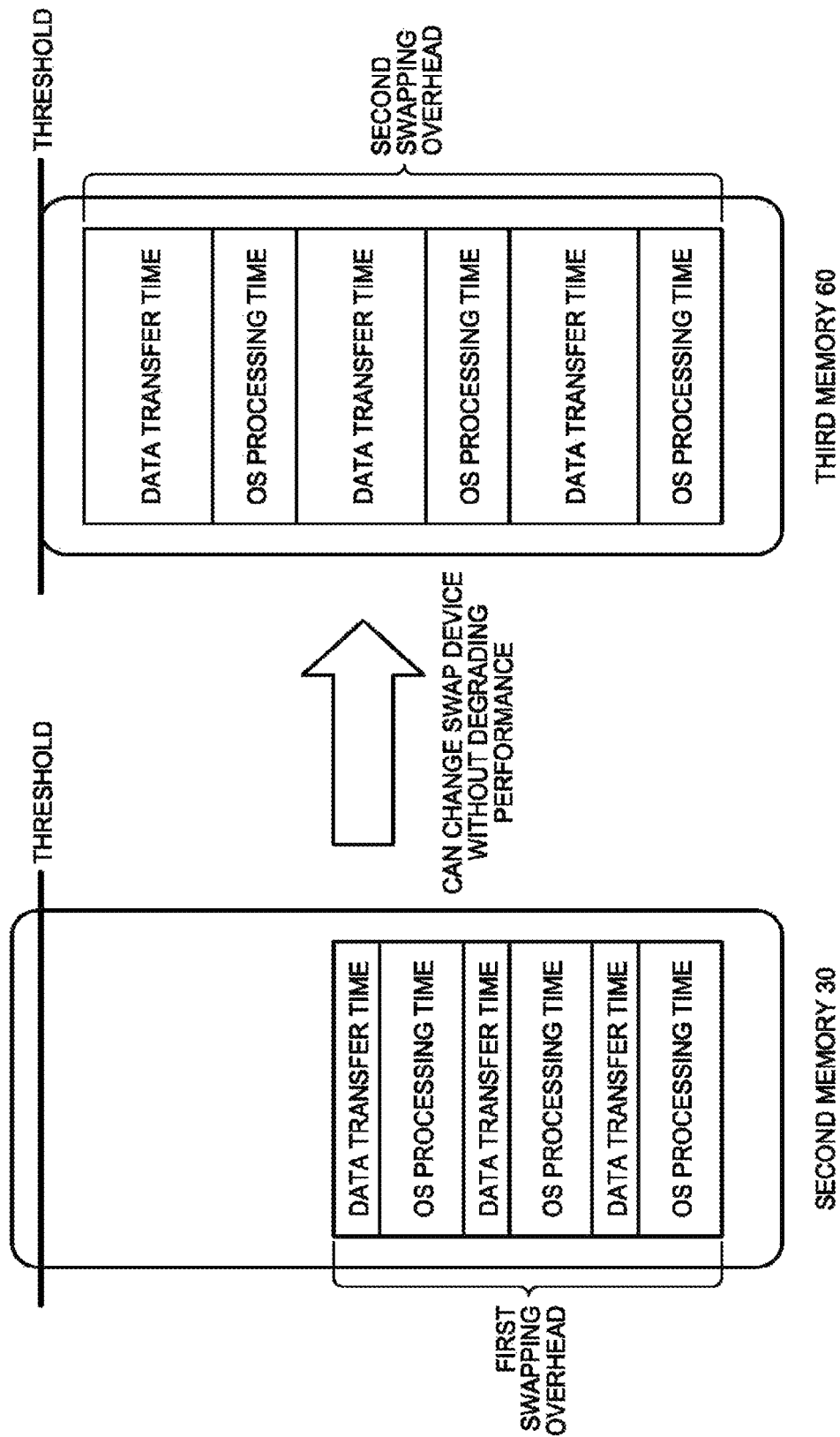
FIG. 12 is a diagram illustrating a specific example of the second embodiment.

Referring to FIG. 12, the details will be described. First of all, the OS runs the first application using the region 1 of the first memory 20 and the second memory 30, monitors swapping occurring in a certain period, and calculates the swapping overhead (referred to as first swapping overhead). As illustrated in FIG. 12, if the first swapping overhead is smaller than the threshold, the OS (calculator 120) calculates the second swapping overhead based on this first swapping overhead.

Here, the second swapping overhead can be calculated by changing only the data transfer time corresponding to each swapping, namely, replacing the value of the data transfer time corresponding to the access speed of the second memory 30 with the value of the data transfer time corresponding to the access speed of the third memory 60, because (or it is supposed that) even when the data transfer time is changed (because of different access speeds) due to the change of the swap device used for processing of the first application from the second memory 30 to the third memory 60, the OS processing time does not significantly change. The data transfer time in the case using the third memory 60 is measured, for example, during installation of the OS and is saved in the format that can be referred to by the OS, and this can be used for calculation. The OS (switching controller 130) then compares the second swapping overhead with the threshold. As illustrated in FIG. 12, when the second swapping overhead is equal to or smaller than the threshold, the OS (switching controller 130) switches the processing corresponding to the first application to the processing using the first memory 20 and the third memory 60 (changes the swap device from the second memory 30 to the third memory 60).

When the swap device for the first application is changed to the third memory 60, as illustrated in the second state in FIG. 11, the first application runs using the region 1 of the first memory 20 and the third memory 60. The memory bandwidth of the second memory 30 is thus used solely by the second application (used exclusively by the second memory 30), thereby further reducing the data transfer time in swapping occurring during operation of the second application.

Figure 13:
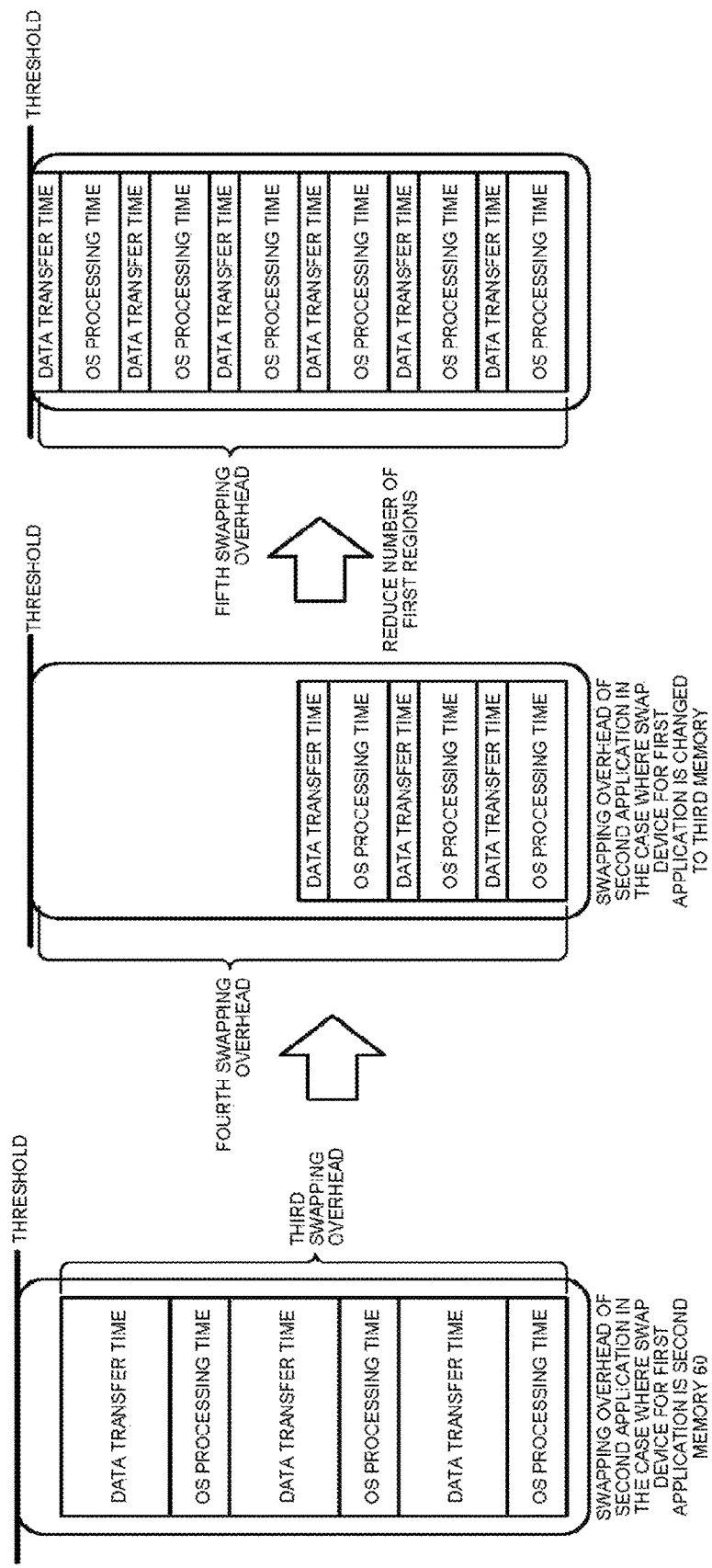
FIG. 13 is a diagram illustrating a specific example of the second embodiment.

In this way, by changing the swap space for the first application, as illustrated in FIG. 13, the swapping overhead of the second application changes from the third swapping overhead indicating the swapping overhead in the case where the swap device for the first application is the second memory 30 to the fourth swapping overhead indicating the swapping overhead in the case where the swap device for the first application is changed to the third memory 60. In the fourth swapping overhead when compared with the third swapping overhead, while the number of times of swapping is unchanged (or not significantly changed) and the OS processing time is unchanged (or not significantly changed), the data transfer time is reduced, because the memory bandwidth of the second memory 30 is used solely by the second application. In this way, because of the reduction of swapping overhead, the number of active regions of the first memory 20 available to the second application may be further reduced, for example, by the method as described above. For example, even when as a result of reducing the number of active regions (as a result of reducing the active capacity of the first memory 20), the number of times of swapping is increased and the swapping overhead of the second application changes to fifth swapping overhead greater than the fourth swapping overhead, the speed performance can be ensured as long as the fifth swapping overhead is equal to or smaller than the threshold. Accordingly, the power consumption can be further reduced while the speed performance is ensured.

Figure 14:
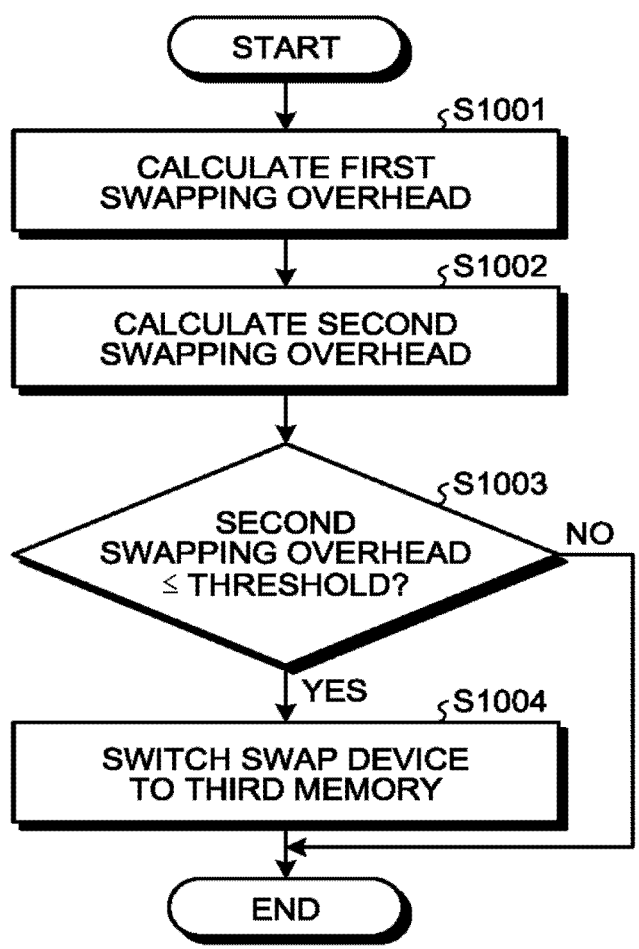
FIG. 14 is a diagram illustrating an operation example of the information processing apparatus according to the second embodiment.

FIG. 14 is a flowchart illustrating an operation example of the information processing apparatus 1 according to the present embodiment. In this example, it is premised that the OS runs the first application using the region 1 of the first memory 20 and the second memory 30. The specifics of each step are as described above.

As illustrated in FIG. 14, first of all, the OS (monitor 111) calculates the first swapping overhead (step S1001). Next, the OS (calculator 120) calculates the second swapping overhead, based on the first swapping overhead calculated at step S1001 (step S1002). Next, the OS (switching controller 130) determines whether the second swapping overhead calculated at step S1002 is equal to or smaller than the threshold (step S1003). If the second swapping overhead is equal to or smaller than the threshold (Yes at step S1003), the OS (switching controller 130) switches the swap device for the first application to the third memory 60 (step S1004). On the other hand, if the second swapping overhead is greater than the threshold (No at step S1003), the processing ends.

Third Embodiment

A third embodiment will now be described. A description of parts in common with the foregoing first embodiment will be omitted as appropriate. When the swapping overhead is equal to or smaller than the fourth threshold, the region controller 110 performs control to reduce the number of active regions, in the same manner as in the foregoing first embodiment. More specifically, when the swapping overhead is equal to or smaller than the fourth threshold, the region controller 110 performs control to set power supplied to any one of active regions to the second power that is lower than the first power to change the active region to an inactive region indicating the region supplied with the second power. Here, the order in which an active region is changed to an inactive region is predetermined.

Figure 15:
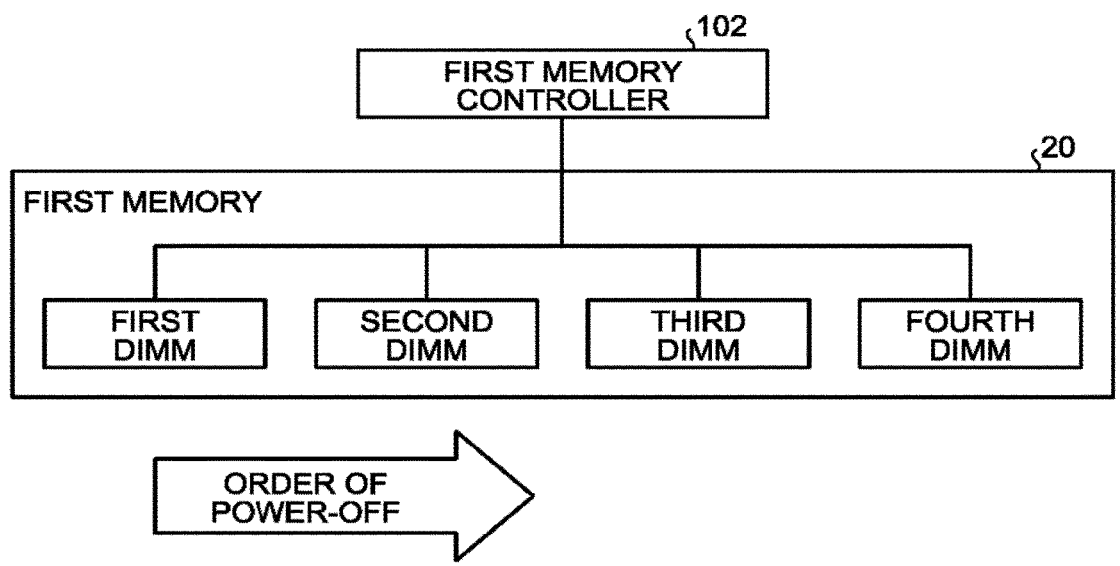
FIG. 15 is a diagram illustrating a configuration of a first memory in a third embodiment.

In the present embodiment, as illustrated in FIG. 15, the first memory 20 is configured with four DIMMs (Dual Inline Memory Modules), namely, a first DIMM to a fourth DIMM (the regions serving as units of power supply (power supply unit region)). The units of power supply are not limited to DIMMs but may be any units that are element units of the first memory 20 (in this example, DRAM), such as ranks and banks, and are capable of power control. In the description here, the units of power supply are DIMMs, by way of example.

When power supply is stopped (powered off) in units of DIMMs (memory module units) to reduce the number of active regions (reduce the active capacity of the first memory 20), higher speed and power saving can be achieved by determining the order in which the DIMMs are powered off in advance and appropriately arranging data not intended to be moved to the swap space so as to efficiently power off DIMMs. For example, if the DIMM having data to be used immediately after power-off or data frequently accessed (that is, data not intended to be moved to the swap space) is powered off, the data arranged (mapped) in the DIMM is temporarily transferred to the swap space (re-mapped) and thereafter immediately returned (transferred) to another DIMM not powered off, which wastes time and power. Then, the data not intended to be moved to the swap space is arranged in the DIMM to be powered off later (more preferably, last), thereby preventing the waste as described above.

A description will be given by taking the first memory 20 illustrated in FIG. 15 as an example. When this first memory 20 is used, the DIMMs are powered off in a defined order for power saving. Specifically, the first DIMM, the second DIMM, and the third DIMM are powered off in this order.

The fourth DIMM is not powered off because the DIMM is necessary for keeping the information processing apparatus 1 in operation. In other words, this first memory 20 (DRAM) is configured with at least a first region, a second region, and a third region. When the power supplied to each of the first region (DIMM), the second region (DIMM), and the third region (DIMM) is the first power (power that makes the OS or the application usable and can at least hold the content of data) and when the swapping overhead indicating the time required for swapping occurring in a certain period in a period for the processor 10 to execute the first processing of processing the first data larger than the total size of the first region, the second region, and the third region is equal to or smaller than the fourth threshold, the OS (region controller 110) performs the control of moving data stored in the first region to the second region or the third region or the second memory 30 and setting power supplied to the first region to the second power, which is power, for example, during power-off lower than the first power, and the control of moving data stored in the second region to the third region or the second memory 30 and setting power supplied to the second region to the second power, in a predetermined order.

To put it another way, the first memory 20 is configured with at least the first region and the second region, and when power supplied to each of the first region and the second region is the first power and when the swapping overhead indicating the time required for swapping occurring in a certain period in a period for the processor 10 to execute the first processing of processing the first data larger than the total size of the first region and the second region is equal to or smaller than the fourth threshold, the first region is defined as the region to be first controlled to be changed into an inactive region.

In order to arrange data not intended to be moved to the swap space, in the DIMM to be powered off later (less likely to be powered off) and to arrange data permitted to be moved to the swap space in the DIMM to be powered off earlier, the priority of memory regions to be reserved is specified when the region to store therein the data processed by the application or the OS (may be considered as a set of memory regions each storing therein data of any given size) is reserved. In other words, the first memory 20 is configured with at least the first region and the second region, and when power supplied to each of the first region and the second region is the first power and when the swapping overhead indicating the time required for swapping occurring in a certain period in a period for executing the first processing of processing the first data larger than the total size of the first region and the second region is equal to or smaller than the fourth threshold, if the first region is defined as the region to be first controlled to be changed to an inactive region, data of the first data that is preferentially arranged in the second region may be specified in advance (for example, can be specified by the application). Specifically, the priority may be set with numerical values or the like in the arguments of the function allocating a memory region for storing therein the data included in the first data. As a result, for example, data having a higher priority is arranged in the fourth DIMM to be powered off later (see FIG. 15), and data having a lower priority is arranged in, for example, the first DIMM to be powered off earlier than the fourth DIMM.

Even when data having a higher priority is arranged in such a DIMM as the first DIMM more likely to be powered off, due to the vacancy condition of the DIMM, the data may be rearranged (re-mapped) in a DIMM not to be powered off immediately, when being moved to the swap space and subsequently allocated (mapped) to a DIMM, or at any other timing. Alternatively, the DIMM used for reserving a memory region may be directly specified. Specifically, for example, a value representing a particular DIMM (for example, the value "4" in the case of the fourth DIMM) is specified in the argument of the function allocating a memory region. For example, the fourth DIMM may be directly specified as a DIMM used when a memory region is reserved for storing therein data not intended to be moved to the swap space. Specifically, the OS (in a different point of view, the information processing apparatus 1) has an interface (API) for the application to specify data not intended to be moved to the swap space, and the OS maps the data specified through this interface preferentially to a DIMM not to be powered off.

Alternatively, the application may notify the OS (region controller 110) of the access characteristic of data as hint information. For example, the OS is notified of whether data is data used repeatedly and frequently or data used just once. The OS refers to the hint information provided by the application to arrange data used repeatedly and frequently in the DIMM to be powered off later and to arrange data used just once in the DIMM to be powered off earlier. Specifically, the OS (in a different point of view, the information processing apparatus 1) has an interface (API) for the application to specify the access characteristic, such as the frequency of use of the data to be processed (which may be considered as, for example, the number of times data is used in a certain period shorter than the period for executing the processing), and the OS allocates (maps) a memory region to store therein the corresponding data to any one of a plurality of DIMMs to be powered off in a predetermined order, in accordance with the access characteristic specified through the interface. For example, when the access characteristic indicating a high frequency of use is specified, the memory region to store therein the corresponding data is preferentially mapped to the DIMM to be powered off later. When the access characteristic indicating a low frequency of use is specified, the memory region to store therein the corresponding data is preferentially mapped to the DIMM to be powered off earlier.

Figure 16:
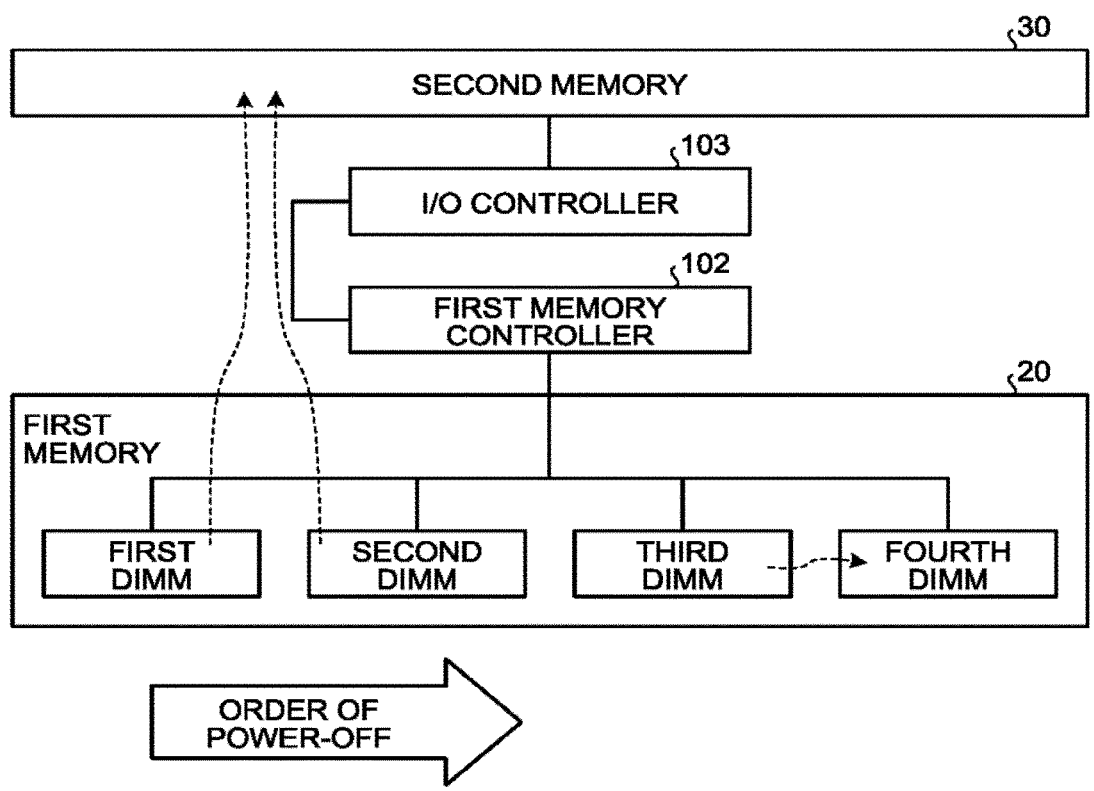
FIG. 16 is a diagram illustrating a specific example of the third embodiment.

When the DIMMs are powered off in a defined order, it is necessary to move the data stored in the DIMM to be powered off, before power-off. In this case, the destination to move may be changed in accordance with the order of power-off the DIM. For example, it is assumed that, as illustrated in FIG. 16, the first memory 20 is configured with a first DIMM, a second DIMM, a third DIMM, and a fourth DIMM, and the DIMMs are powered off in ascending order, namely, first DIMM→second DIMM→third DIMM→fourth DIMM.

In this case, when the second DIMM serving as a reference is powered off, the OS moves data stored in the second DIMM to the second memory 30 before powering off the second DIMM. Similarly, when the first DIMM determined to be powered off prior to the second DIMM is powered off, the OS moves data stored in the first DIMM to the second memory 30 before powering off the first DIMM. On the other hand, when the DIMM to be powered off later than the second DIMM as a reference is powered off, the data stored in that DIMM is moved (moved if possible) to another DIMM to be powered off later than that DIMM, before that DIMM is powered off. Specifically, when the third DIMM is powered off, the data stored in the third DIMM is moved to the fourth DIMM to be powered off later than the third DIMM, before the third DIMM is powered off.

In short, the first memory 20 (DRAM) is configured with at least a first region, a second region, a third region, and a fourth region, and the OS (region controller 110) performs control to change any one of the first region, the second region, the third region, and the fourth region front an active region to an inactive region in a predetermined order (control to change the supplied power from the first power to the second power) in a range in which the swapping overhead indicating the time required for swapping occurring in a certain period in a period for the processor 10 to execute the first processing of processing the first data larger than the total size of the first region, the second region, the third region, and the fourth region is equal to or smaller than the threshold.

When the first region to be changed to an inactive region earlier than the second region as a reference is changed from an active region to an inactive region, the OS (region controller 110) moves the data stored in the first region to the second memory 30 and thereafter changes power supplied to the first region to the second power. When the second region is changed from an active region to an inactive region, the OS moves the data stored in the second region to the second memory 30 and thereafter changes power supplied to the second region to the second power. When the third region to be changed to an inactive region later than the second region is changed to an inactive region, the OS moves the data stored in the third region to the fourth region to be changed to an inactive region later than the third region and thereafter changes power supplied to the third region to the second power. In this way, more important data (data not intended to be moved to the swap space) is left in the DIMM (first memory 20) if possible, thereby suppressing performance reduction and increased power consumption due to the move to the swap space. It is noted that the data moved from the third DIMM to the fourth DIMM may be part or the whole of the data stored in the third DIMM. If part of the data is moved, the remaining data is moved to the second memory 30.

It is also possible that the application or the OS specifies such that the order of changing from an active region to an inactive region is partially or completely ignored. For example, in a case where the DIMM including the specified data (or address) is specified so as not to be changed to an inactive region (not to be powered off) and the specified data exists in the first DIMM, although the first DIMM should be powered off in the defined order, the control may be performed such that the first DIMM is not powered off but the second DIMM is first powered off. This control may be performed temporarily during operation of the application.

As a method other than powering off the DIMMs in a defined order, the DIMM to be powered off may be selected using an algorithm such as LRU. For example, LRU (Least Recently Used) may be used to select the DIMM in which the largest number of pages to be selected shortly as candidates moved to the swap space are arranged. The OS may provide means (API) for switching between powering off the DIMMs in a defined order and selecting the DIMM to be powered off using any given algorithm such as LRU. The application may select the DIMM to be powered off using this means (API). Of a plurality of DIMMs, some of DIMMs may be powered off using any given algorithm such as LRU and the other DIMMs may be powered off in a defined order.

In other words, the first memory 20 is configured with at least a first region, a second region, and a third region. The OS (region controller 110) may perform control to change the first region or the second region from an active region to an inactive region in the order in accordance with a predetermined algorithm (for example, LRU) in a range in which the swapping overhead indicating the time required for swapping occurring in a certain period in a period for the processor 10 to execute the first processing of processing the first data larger than the total size of the first region, the second region, and the third region is equal to or smaller than the threshold. The OS may not perform control of changing the third region to an inactive region.

Fourth Embodiment

Figure 17:
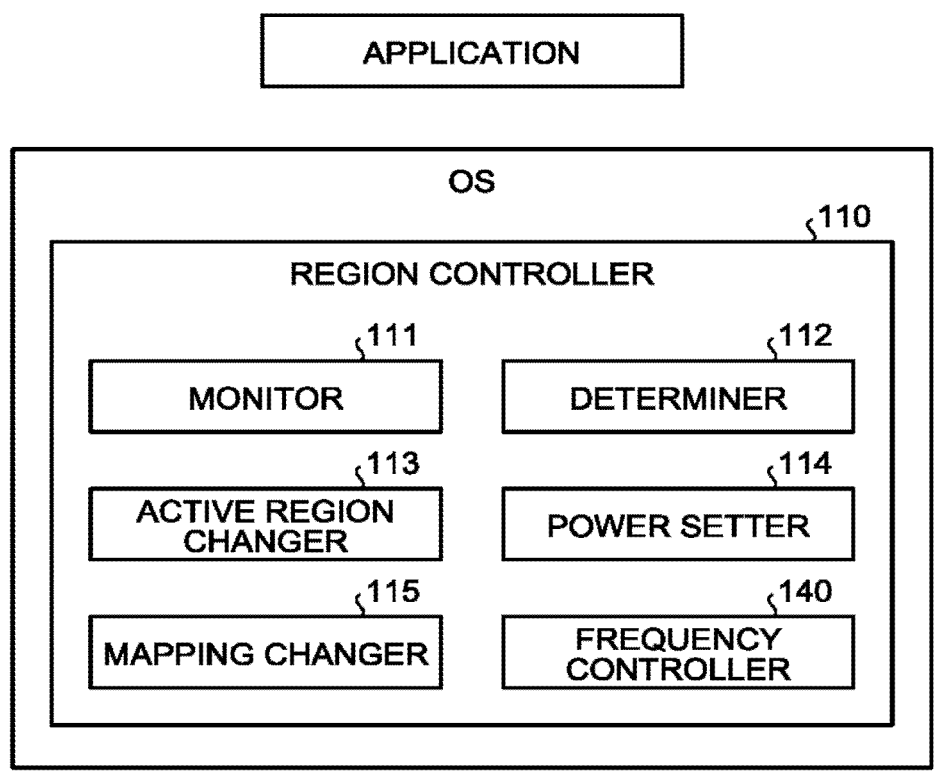
FIG. 17 is a diagram illustrating software of an information processing apparatus a fourth embodiment.

A fourth embodiment will now be described. A description of parts in common with the foregoing first embodiment will be omitted as appropriate. In the present embodiment, as illustrated in FIG. 17, the OS further includes a frequency controller 140. The frequency controller 140 performs control to change the clock frequency for operating the first memory 20 (clock frequency of the DIMM) in a range in which the swapping overhead is equal to or smaller than the threshold. In this example, the region controller 110 has the function of the frequency controller 140. However, the embodiment is not limited to this configuration, and for example, the frequency controller 140 may be provided separately from the region controller 110.

Specifically, when the swapping overhead is smaller than the threshold, the clock frequency of the DIMMs may be reduced in a range equal to or smaller than the threshold, thereby to achieve power saving while satisfying the required performance (the required speed performance of the application). When the swapping overhead slightly exceeds the threshold but the swapping overhead can be fitted to the threshold or smaller through adjustment of the clock frequency of the DIMMs, the required performance can be satisfied by increasing the clock frequency of the DIMMs, without increasing the number of active regions. In other words, power saving can be achieved while the required performance is satisfied.

It is now assumed that the clock frequency for operating the first memory 20 (the clock frequency of the DIMMs) is a first clock frequency. As described above, the region controller 110 calculates the swapping overhead indicating the time required for one or more swapping processes occurring in a certain period during operation of the application and determines whether the calculated swapping overhead is greater than the threshold. The swapping overhead with the first clock frequency hereinafter may be referred to as "first overhead".

Figure 18:
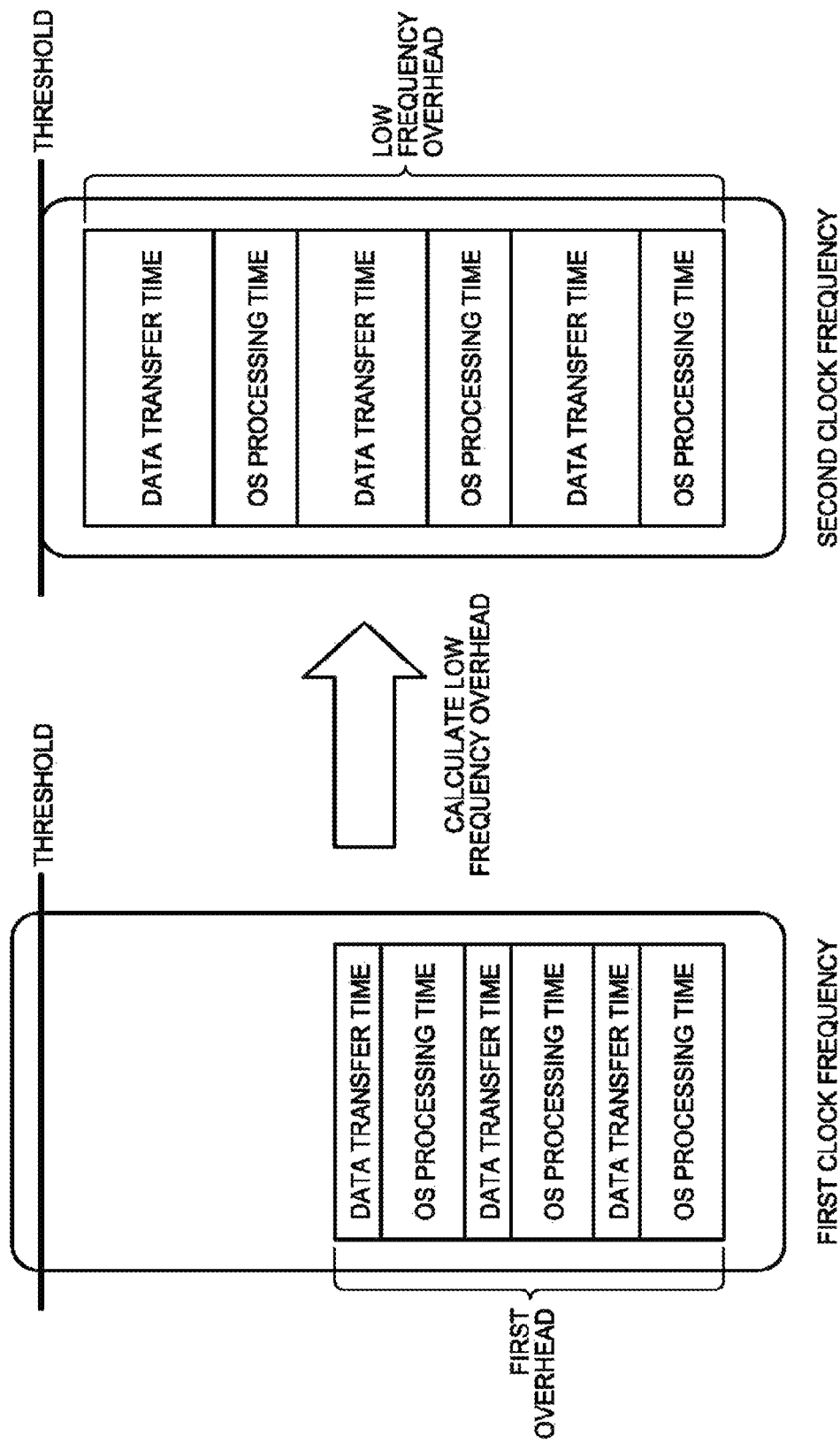
FIG. 18 is a diagram illustrating a specific example of the fourth embodiment.

As illustrated in FIG. 18, when the first overhead is smaller than the threshold, the frequency controller 140 estimates (calculates) low-frequency overhead indicating the swapping overhead in a case where the clock frequency of the DIMMs is reduced from the first clock frequency to a second clock frequency lower than the first clock frequency. Here assuming that changing the clock frequency does not significantly change the OS processing time, the amount of change in data transfer time is estimated. The difference between the first overhead and the low-frequency overhead can be estimated as the difference between the total data transfer time in the case using the first clock frequency (a total of data transfer times of each swapping occurring multiple times) and the total data transfer time in the case using the second clock frequency. The data transfer time in the case using the first clock frequency and the data transfer time in the case using the second clock frequency, which are necessary for the estimation, can be measured at any timing such as during installation of the OS or during start-up of the application and can be saved in any format such as a table that can be referred to by the region controller 110. The region controller 110 then refers to this table to perform calculation necessary for estimation of the low-frequency overhead. When the estimated low-frequency overhead is equal to or smaller than the threshold, the region controller 110 (frequency controller 140) changes the clock frequency of the DIMMs to the second clock frequency. If the estimated low-frequency overhead exceeds the threshold, the processing ends.

Figure 19:
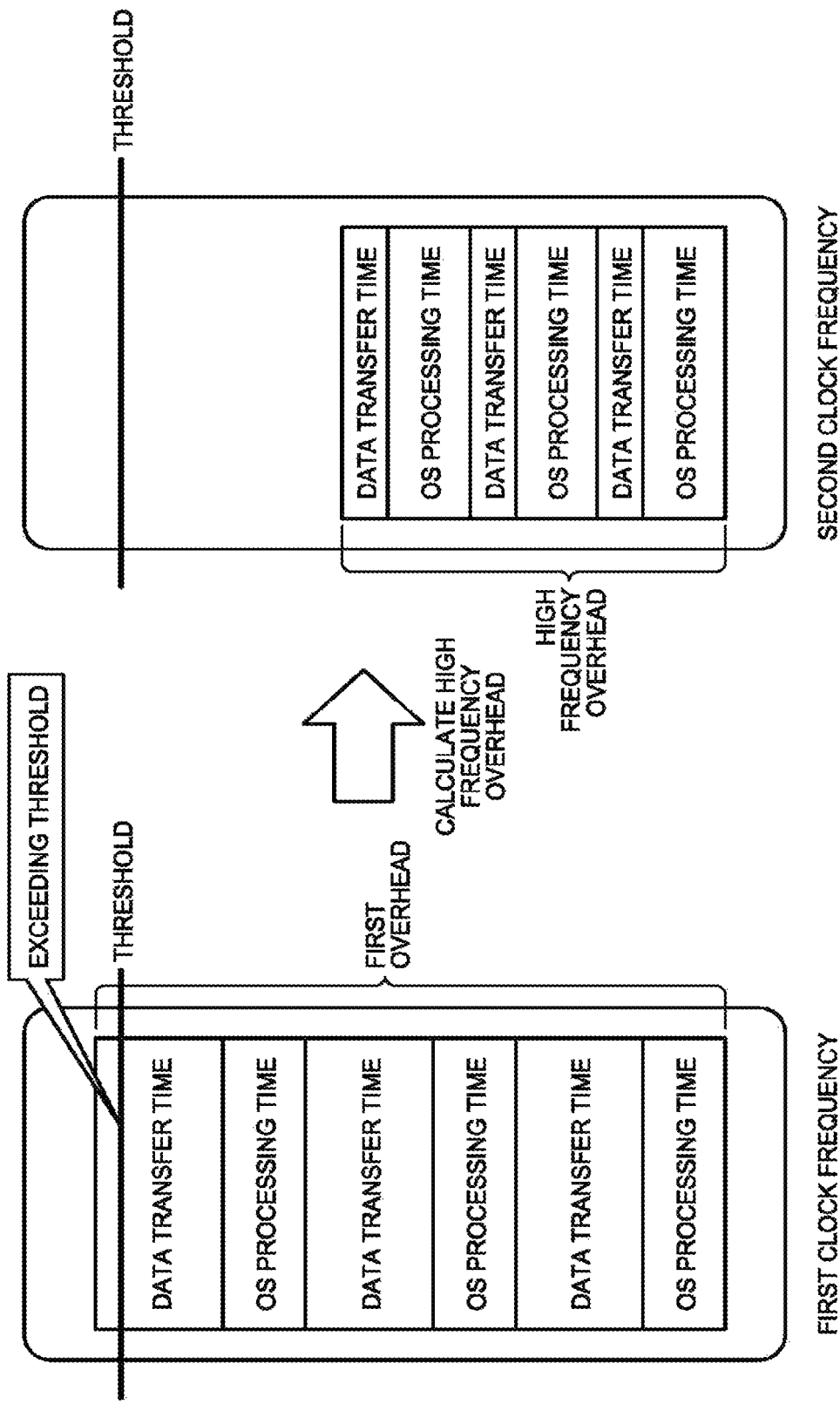
FIG. 19 is a diagram illustrating a specific example of the fourth embodiment.

On the other hand, as illustrated in FIG. 19, when the first overhead exceeds the threshold, the frequency controller 140 estimates high-frequency overhead indicating the swapping overhead in a case where the clock frequency of the DIMMs is increased from the first clock frequency to a third clock frequency indicating a clock frequency higher than the first clock frequency. This estimation is performed in the same manner as the estimation of the low-frequency overhead. When the estimated high-frequency overhead is equal to or smaller than the threshold, the region controller 110 (frequency controller 140) changes the clock frequency of the DIMMs to the third clock frequency. When the estimated high-frequency overhead exceeds the threshold, the processing ends.

Figure 20:
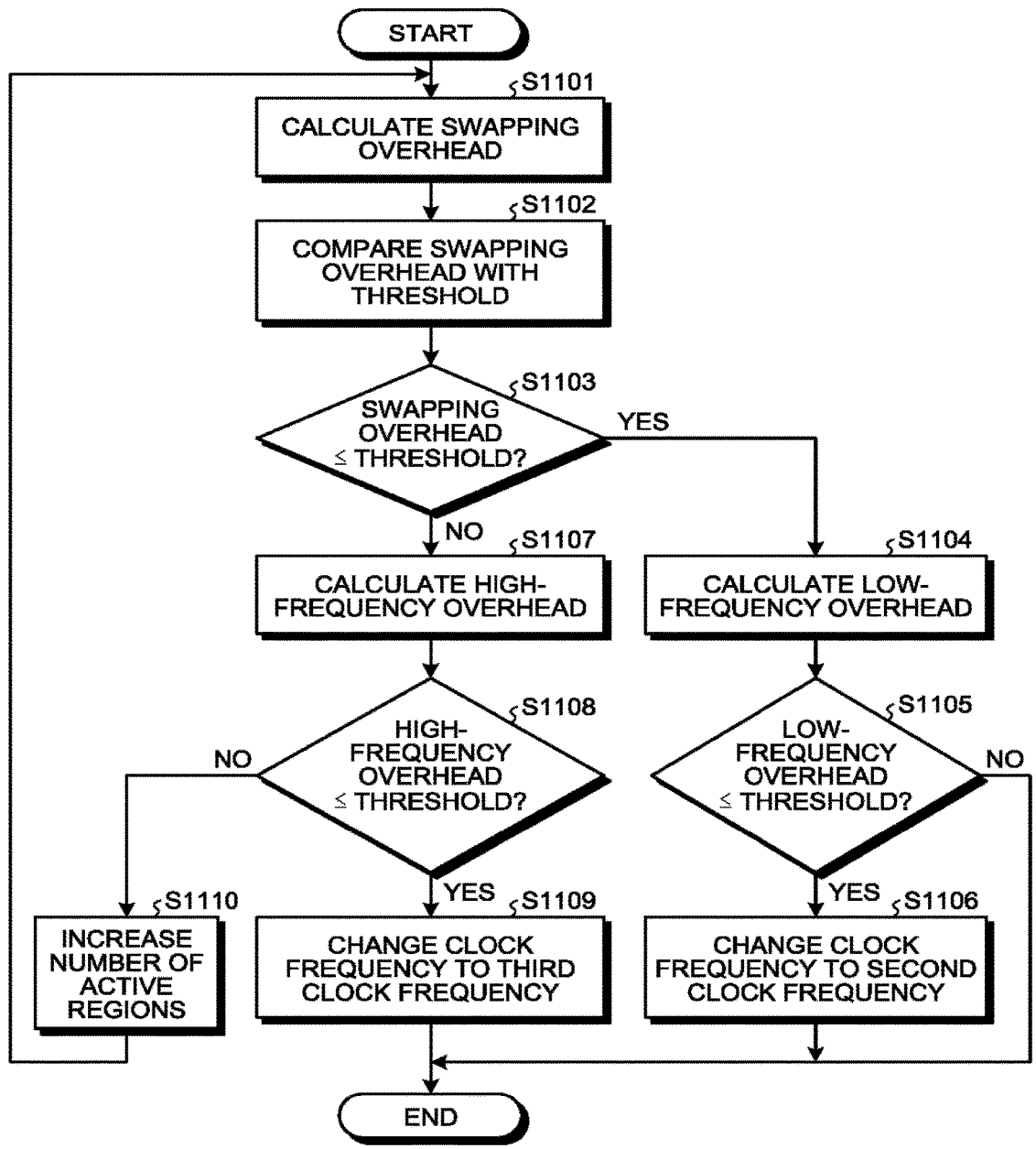
FIG. 20 is a diagram illustrating an operation example of the information processing apparatus the fourth embodiment.

FIG. 20 is a flowchart illustrating an operation example of the information processing apparatus 1 according to the present embodiment. The processing at step S1101 to step S1103 illustrated in FIG. 20 is the same as the processing at step S401 to step S403 illustrated in FIG. 6. If the determination at step S1103 is Yes (Yes at step S1103), the frequency controller 140 calculates the low-frequency overhead (step S1104). For example, the frequency controller 140 may calculate a plurality of low-frequency overheads having one-to-one correspondence with different kinds of second clock frequencies. Next, the frequency controller 140 determines whether the low-frequency overhead calculated at step S1104 is equal to or smaller than a threshold (step S1105). If the determination at step S1105 is Yes (Yes at step S1105), the frequency controller 140 changes the clock frequency to the second clock frequency (step S1106). If the determination at step S1105 is No (No at step S1105), the processing ends.

On the other hand, if the determination at step S1103 is No (No at step S1103), the frequency controller 140 calculates the high-frequency overhead (step S1107). For example, the frequency controller 140 may calculate a plurality of high-frequency overheads having one-to-one correspondence with different kinds of third clock frequencies. Next, the frequency controller 140 determines whether the high-frequency overhead calculated at step S1107 is equal to or smaller than a threshold (step S1108). If the determination at step S1108 is Yes (Yes at step S1108), the frequency controller 140 changes the clock frequency to the third clock frequency (step S1109). If the determination at step S1108 is No (No at step S1108), the processing proceeds to step S1110. The processing at step S1110 is the same as the processing at step S404 illustrated in FIG. 6.

Fifth Embodiment

Figure 21:
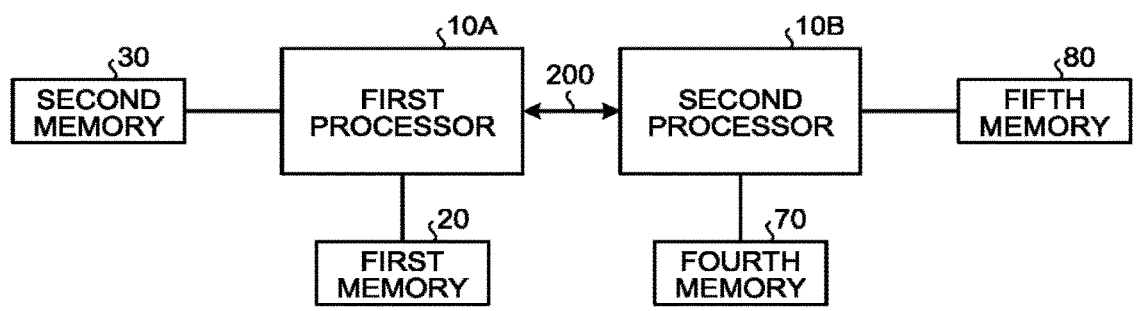
FIG. 21 is a diagram illustrating an exemplary configuration of an information processing apparatus according to a fifth embodiment.

A fifth embodiment will now be described. A description of parts in common with the foregoing first embodiment will be omitted as appropriate. In the present embodiment, as illustrated in FIG. 21, a plurality of processors 10 (in the example in FIG. 21, a first processor 10A and a second processor 10B) are connected with each other through a fast interconnect (cache coherent interconnect) 200 such as Intel QuickPath Interconnect (QPI) to ensure the protocol (cache coherence protocol) indicating the procedure for preventing data inconsistency between a plurality of cache memories. Alternatively, the processors may be connected through a network or a shared memory. The example in FIG. 21 is an example of the processor system having a non-uniform memory access (NUMA) configuration such as the XEON processor system. The configuration of FIG. 21 will be described below by way of example. The configuration of each of the first processor 10A and the second processor 10B illustrated in FIG. 21 is the same as the configuration of the processor 10 illustrated in FIG. 1.

The first processor 10A is an example of "first processing device" and processes the first data. More specifically, the first processor 10A executes the first processing (in this example, the first application) of processing the first data. The first memory 20 is a memory storing therein at least part of the first data and is configured with DRAM in this example. The first memory 20 functions as a main memory (main storage device), and the first processor 10A directly reads/writes data on the first memory 20. The second memory 30 is a memory in which swap space is reserved and is configured with NVM in this example. The second memory 30 can be considered as a memory storing therein part of the first data. The configuration of each of the first processor 10A, the first memory 20, and the second memory 30 is the same as the configuration in FIG. 1.

The second processor 10B is an example of the "second processing device" and processes eighth data (denoted as this for convenience of explanation). More specifically, the second processor 10B executes the second processing (in this example, second application) of processing the eighth data. A fourth memory 70 is a memory storing therein at least part of the eighth data and is configured with DRAM in this example. The fourth memory 70 functions as a main memory (main storage device), and the second processor 10B directly reads/writes data on the fourth memory 70. Here, the fourth memory 70 is a memory corresponding to the first memory 20 illustrated in FIG. 1. A fifth memory 80 is a memory in which swap space is reserved and is configured with NVM in this example. The fifth memory 80 can be considered as a memory storing therein part of the eighth data. Here, the fifth memory 80 is a memory corresponding to the second memory 30 illustrated in FIG. 1. The eighth data is data, similar to the first data, having a size larger than one or more active regions of the fourth memory 70 indicating regions supplied with the first power that is necessary for at least holding the content of data.

Figure 22:
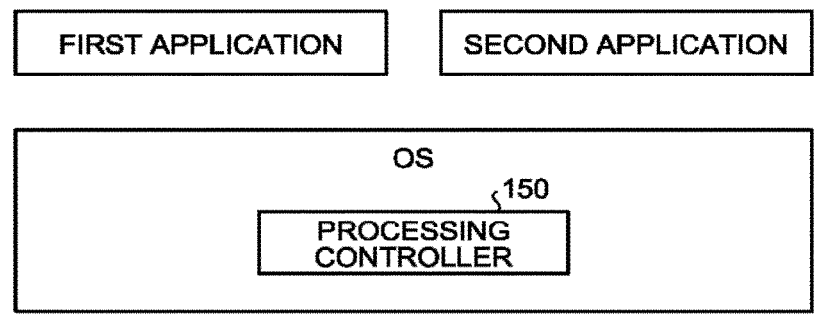
FIG. 22 is a diagram illustrating software of the information processing apparatus according to the fifth embodiment.

In the processor system according to the present embodiment, the first processor 10A and the second processor 10B execute a common OS. FIG. 22 is a diagram illustrating an example of the functions of the OS according to the present embodiment. As illustrated in FIG. 22, the OS includes a processing controller 150. Although in the example in FIG. 22, only the functions related to the present embodiment are described by way of illustration, the functions of the OS are not limited to those. For example, the OS may have the function of corresponding region controller 110 for each of the first processor 10A and the second processor 10B. For example, when connected through a network or a shared memory, the processors may execute different OSes.

The processing controller 150 calculates first swapping overhead (first processing information) indicating the amount of processing (indicating the swapping overhead of the first swapping (the first moving processing)) for moving at least part of second data indicating data stored in the first memory 20 to the second memory 30 and moving at least part of third data indicating data stored in the second memory 30 to the first memory 20, in a certain period in a period for processing the first data (a certain period in a period for executing the first processing). For example, the first swapping occurs when a first target page indicating a page requested for read/write, of the pages included in the first data, exists on the second memory 30, in a certain period in a period for executing the first processing, and is the processing for moving a page on the first memory 20 as second data to the second memory 30 and moving a first target page on the second memory 30 as third data to the first memory 20.

The processing controller 150 calculates sixth swapping overhead (fifth processing information) indicating the amount of processing (indicating the swapping overhead of the third swapping (third moving processing)) for moving at least part of ninth data indicating data stored in the fourth memory 70 to the fifth memory 80 and moving at least part of tenth data indicating data stored in the fifth memory 80 to the fourth memory 70, in a certain period in a period for processing eighth data (a certain period in a period for executing the second processing). For example, the third swapping occurs when a second target page indicating a page requested for read/write, of the pages included in the eighth data, exists on the fifth memory 80, in a certain period in a period for executing the second processing, and is the processing for moving a page on the fourth memory 70 as ninth data to the fifth memory 80 and moving a second target page on the fifth memory 80 as tenth data to the fourth memory 70.

Figure 23:
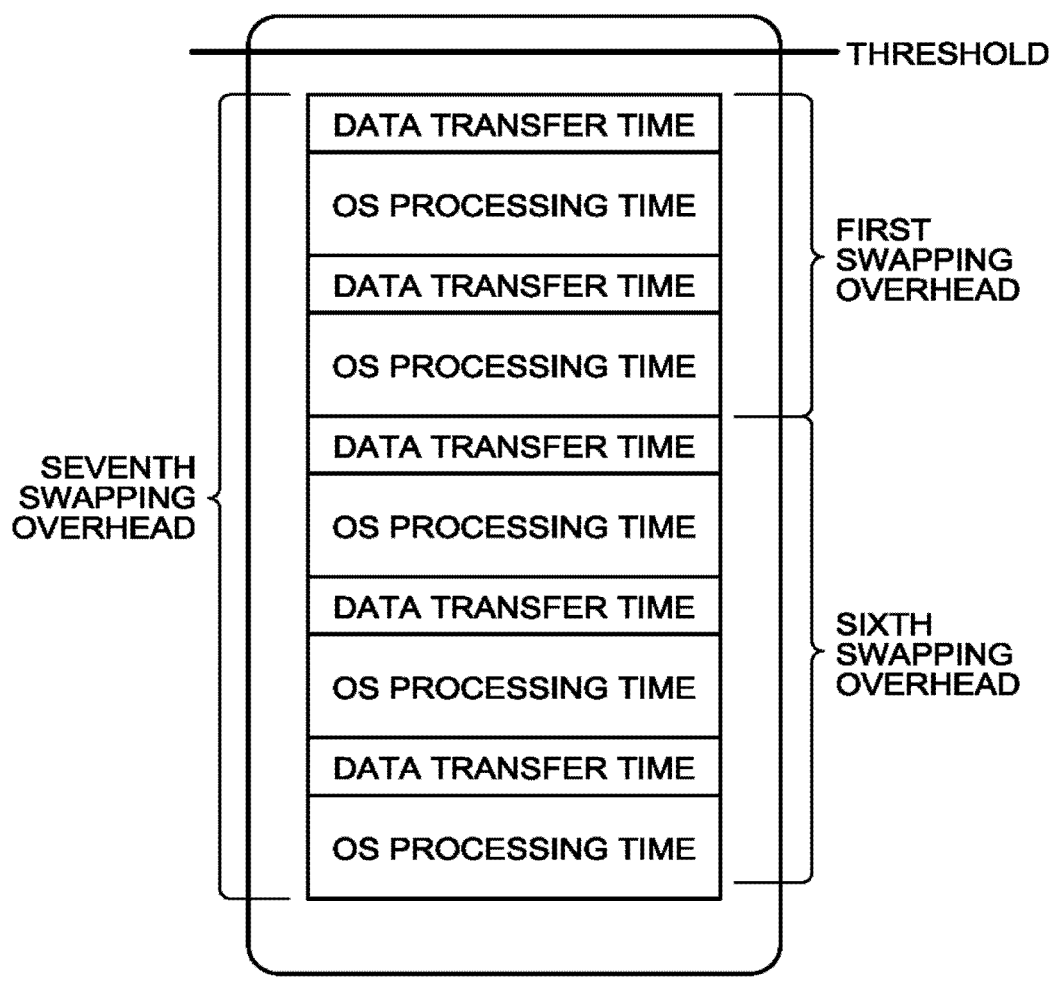
FIG. 23 is a diagram illustrating a specific example of the fifth embodiment.

The processing controller 150 then calculates seventh swapping overhead indicating the sum of the first swapping overhead and the sixth swapping overhead. As illustrated in FIG. 23, when the seventh swapping overhead is equal to or smaller than the threshold, the processing controller 150 determines that the required performance will be satisfied even when the first processing is shifted to the second processor 10B, and performs control to allow the second processor 10B to execute the processing of the first data (first processing). In this case, since the process running on the first processor 10A no longer exists, the OS can control power supplied to each of the first processor 10A, the first memory 20, and the second memory 30 to a value (for example, zero) lower than the power making each of them operable. This control can achieve power saving. Conversely, the processing controller 150 may perform control to allow the first processor 10A to execute the second processing. When the seventh processing swapping overhead is calculated, the first swapping overhead, the sixth swapping overhead, and additionally the overhead taken for the control of allowing the second processor 10B to execute the first processing (shifting the first processing to the second processor 10B) may be summed up.

Figure 24:
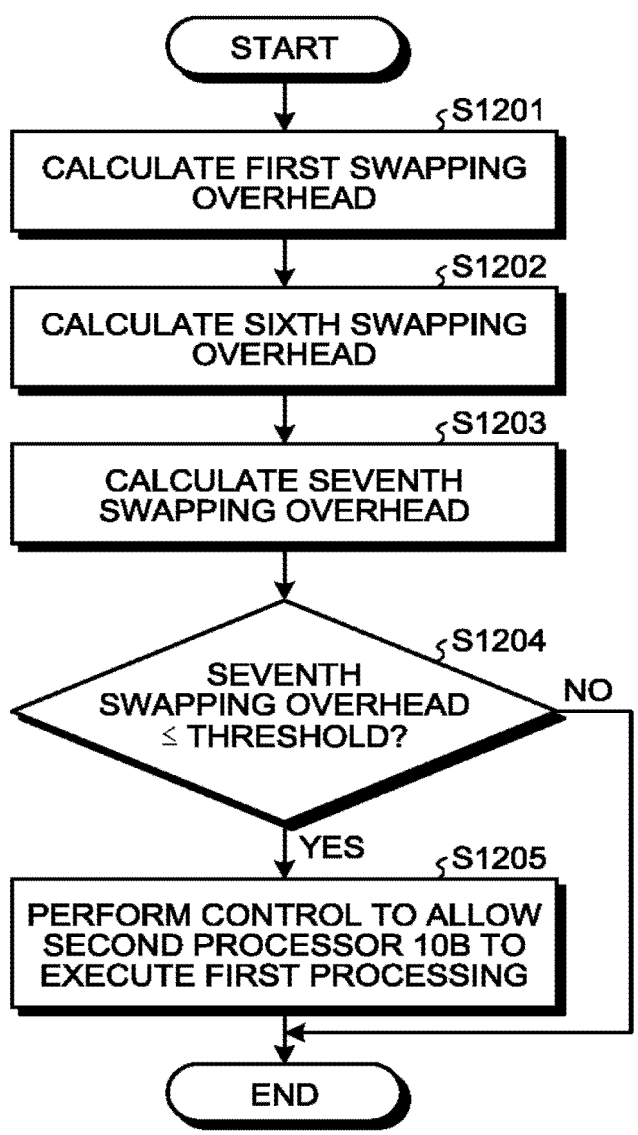
FIG. 24 is a diagram illustrating an operation example of the information processing apparatus according to the fifth embodiment.

FIG. 24 is a flowchart illustrating an operation example of the information processing apparatus 1 according to the present embodiment (processing controller 150). The specifics of each step are as described above. As illustrated in FIG. 24, the processing controller 150 calculates the first swapping overhead (step S1201). The processing controller 150 also calculates the sixth swapping overhead (step S1202). Next, the processing controller 150 calculates the seventh swapping overhead (step S1203). Next, the processing controller 150 determines whether the seventh swapping overhead calculated at step S1203 is equal to or smaller than the threshold (step S1204). If the determination at S1204 is Yes (Yes at step S1204), the processing controller 150 performs control to allow the second processor 10B to execute the first processing (shift the first processing to the second processor 10B) (step S1205). If the determination at S1204 is No (No at step S1204), the processing ends.

When the seventh swapping overhead is calculated, reduction in access speed caused by sharing the memory bandwidth of the fourth memory 70 or the fifth memory 80 between the first processing and the second processing may be taken into consideration. Specifically, first, the processing controller 150 obtains eighth swapping overhead indicating the result of replacing the data transfer time included in the first swapping overhead with the data transfer time in consideration of the reduction in access speed. Next, the processing controller 150 obtains ninth swapping overhead indicating the result of replacing the data transfer time included in the sixth swapping overhead with the data transfer time in consideration of the reduction in access speed. Next, the sum of the eighth swapping overhead and the ninth swapping overhead may be calculated as the seventh swapping overhead and compared with the threshold.

Sixth Embodiment

Figure 25:
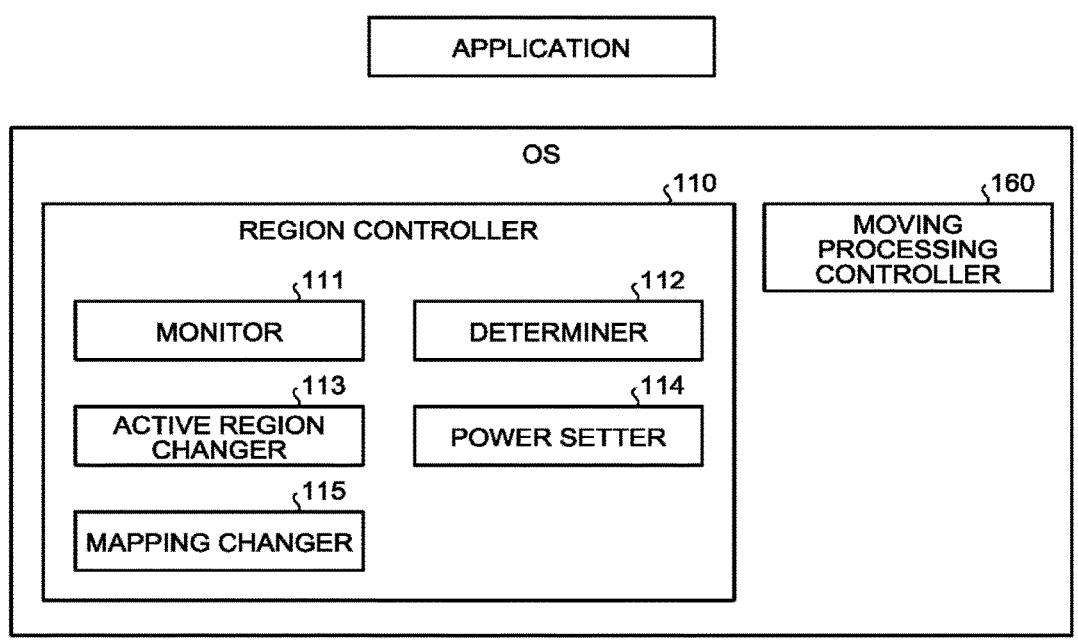
FIG. 25 is a diagram illustrating software of an information processing apparatus according to a sixth embodiment.

A sixth embodiment will now be described. A description of parts in common with the foregoing first embodiment will be omitted as appropriate. FIG. 25 is a diagram illustrating an example of the functions of the OS according to the present embodiment. As illustrated in FIG. 25, the OS further includes a moving processing controller 160. Although the moving processing controller 160 is provided separately from the region controller 110 in this example, the embodiment is not limited to this configuration. For example, the region controller 110 may have the function of the moving processing controller 160.

If the OS is committed to the processing of using the first memory 20 having a small size (with the limited number of active regions) in combination with the second memory 30 (committed to the swapping using the virtual memory scheme of the OS), the development of applications is easy. However, the OS processing time increases mainly because of the time for context switching, and the required performance may not be satisfied. Then, in the present embodiment, the time (overhead) required for context switching or the like is reduced by performing swapping at the user level (application level) to reduce (or eliminate) the processing of the OS, thereby reducing the OS processing time. Reducing the OS processing time can also reduce the swapping overhead and reduce the number of active regions of the first memory 20 (the active capacity of the first memory 20), accordingly. Thus, further power saving can be achieved.

The moving processing controller 160 according to the present embodiment performs control to execute swapping (moving processing) occurring when the application corresponding to the first processing of processing the first data (data having a size larger than one or more active regions of the first memory 20) requests read/write of fourth data indicating data included in the first data and to allow the application to execute swapping occurring when the application requests read/write of fifth data included in the first data and requiring faster processing than with the fourth data.

Figure 26:
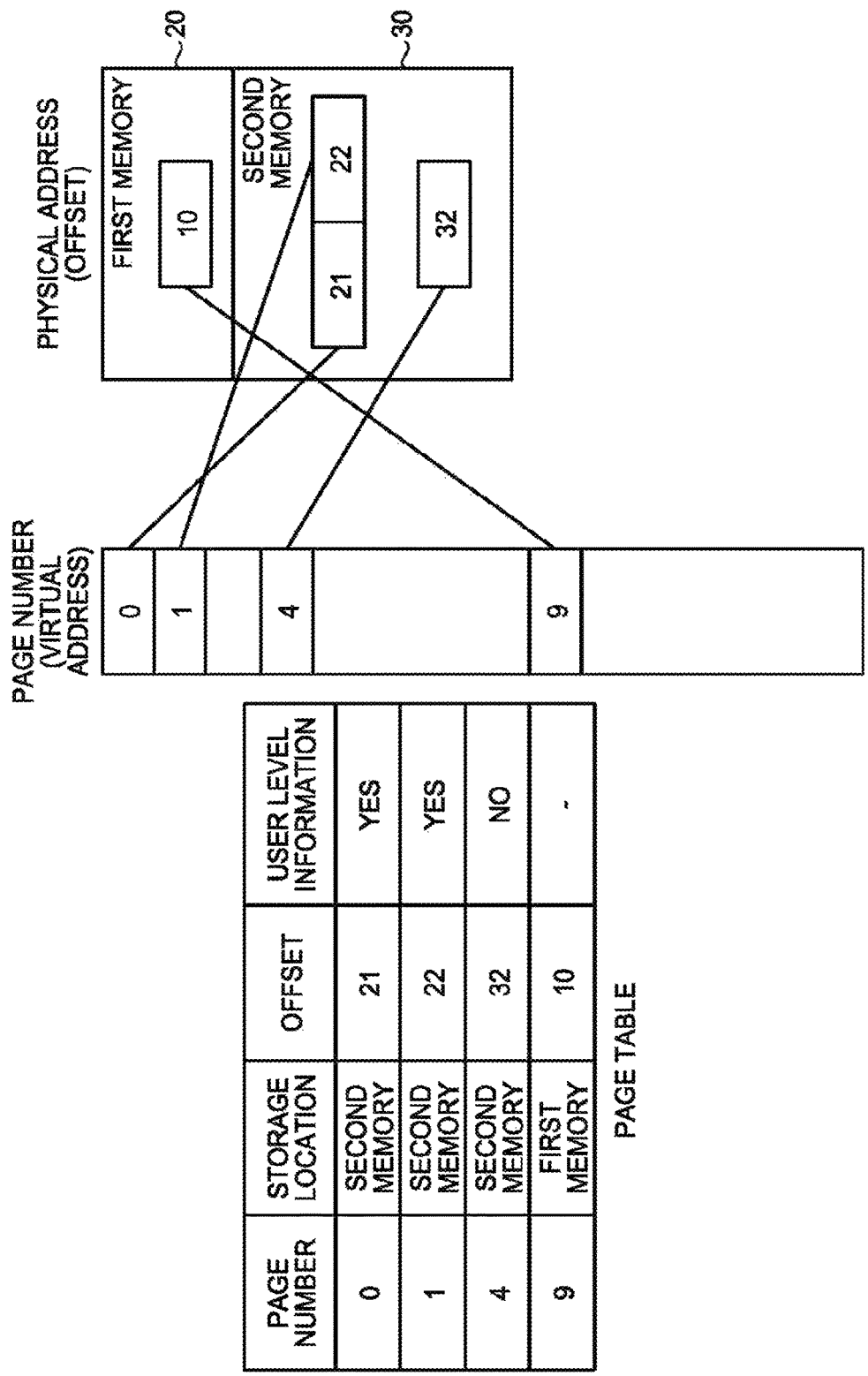
FIG. 26 is a diagram illustrating a page table in the sixth embodiment.

The moving processing controller 160 can control whether to allow the application to execute swapping occurring during operation of the application, using correspondence information that associates a plurality of pages (pages associated with virtual addresses) with user level information indicating whether to allow the application to execute swapping, for example, as illustrated in FIG. 26. In the example in FIG. 26, the correspondence information is the aforementioned page table in which a page number for identifying a page corresponding to a virtual address indicating the location of data in virtual space (data in units of processing), a physical storage location of the page, an offset, and the user level information are associated with each other. The offset is information indicating the position in the first memory 20 or the second memory 30 that is mapped with a page (that is, physical address). In the example in FIG. 26, the user level information indicating "Yes" means that swapping occurring along with access to the corresponding page is to be executed by the application. The user level information indicating "No" means that swapping occurring along with access to the corresponding page is not to be executed by the application but to be executed by the OS (moving processing controller 160). Here, the user level information for the page corresponding to data requiring fast processing, of the data included in the first data indicating data to be processed by the application, is set to "Yes". The format of the page table is not limited to the format illustrated in FIG. 26.

For example, when the OS receiving a request from the application accesses the page corresponding to the page number indicating "0", a page fault occurs (this is because in the example in FIG. 26, the storage location of the page corresponding to the page number indicating "0" is "second memory 30"). The OS (moving processing controller 160) refers to the page table to check the user level information corresponding to the page number indicating "0". Since this user level information indicates "Yes", the application making the request (user level library) is notified that a page fault occurs. The application receiving this notification performs swapping for moving the data (data in units of pages) stored in the region in the second memory 30 indicated by the offset ("21") corresponding to the page number indicating "0" to the first memory 20 and purging data (data in units of pages) on the first memory 20 to the second memory 30, and changes the mapping in the page table in accordance with the swapping.

Similarly, when the OS receiving a request from the application accesses the page corresponding to the page number indicating "4", a page fault occurs. The OS (moving processing controller 160) refers to the page table to check the user level information corresponding to the page number indicating "4". Since this user level information indicates "No", the OS proceeds to perform swapping for moving data (data in units of pages) stored in the region in the second memory 30 indicated by the offset ("32") corresponding to the page number indicating "4" to the first memory 20 and purging data (data in units of pages) on the first memory 20 to the second memory 30, and changes the mapping in the page table in accordance with the swapping.

In this example, the swapping occurring along with access to data requiring fast processing, of the data (first data) processed by a single application, is executed by the application, whereas the swapping occurring along with access to other data is executed by the OS (moving processing controller 160). Alternatively, for example, swapping occurring during operation of the first application may be executed by the OS, whereas swapping occurring during operation of a second application requiring higher speed than the first application may be executed by the second application.

Figure 27:
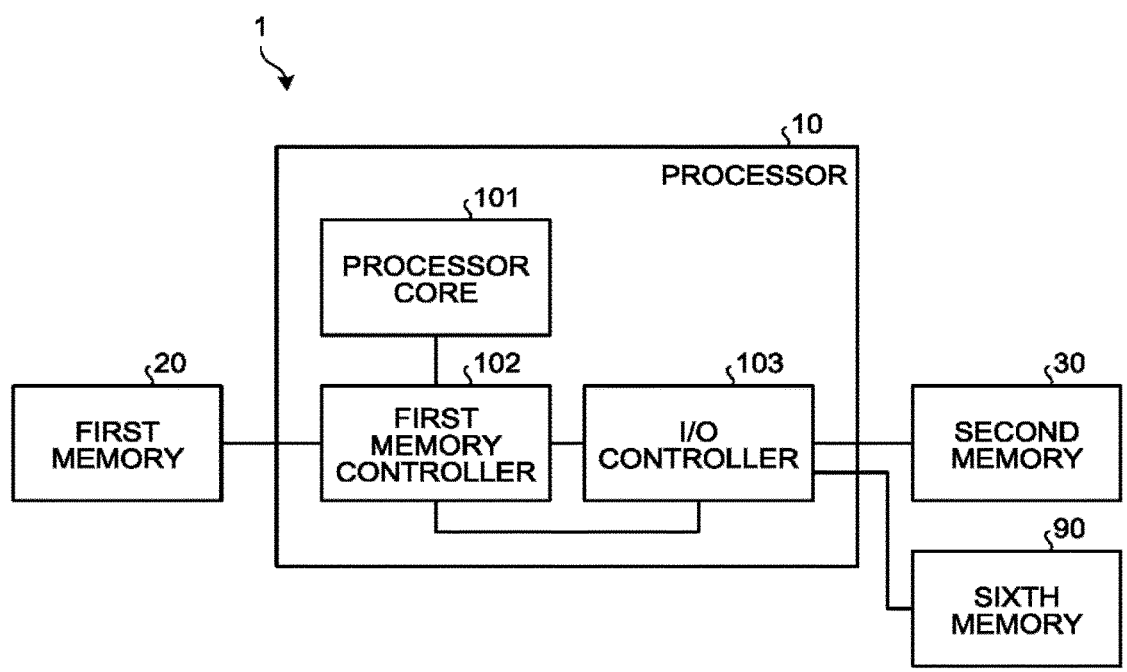
FIG. 27 is a diagram illustrating an exemplary configuration of an information processing apparatus according to a modification.
Figure 28:
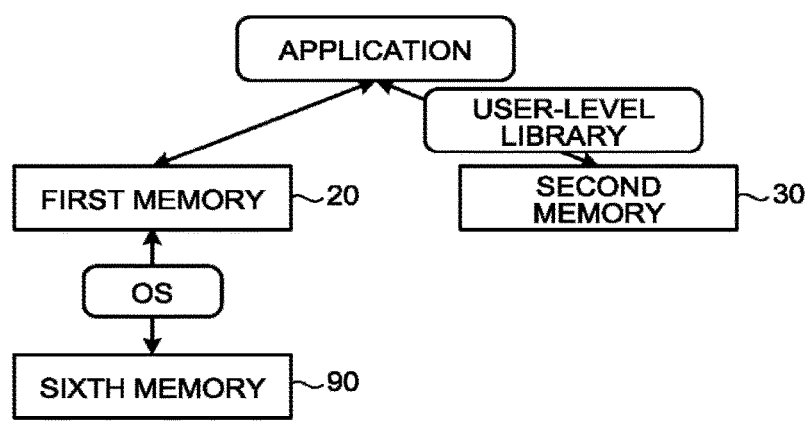
FIG. 28 is a diagram illustrating an overview of the modification.

For example, as illustrated in FIG. 27, the processor 10 may be connected to a sixth memory 90 such as SSD or HDD through an I/O controller 103. In this configuration, of data that is included in data (first data) to be processed by a single application and does not exist in the first memory 20 (data not mapped to the first memory 20), data requiring fast processing may be arranged in the second memory 30, and other data may be arranged in the sixth memory 90. That is, of data included in the first data, for data requiring fast processing, the second memory 30 may be used as a swap device, and for other data, the sixth memory 90 may be used as a swap device. In this case, as illustrated in FIG. 28, the OS (moving processing controller 160) can perform control to execute swapping (swapping between the first memory 20 and the second memory 30) occurring along with access to data requiring fast processing, of the first data to be processed by the application and, meanwhile, to allow the application to execute swapping (swapping between the first memory 20 and the sixth memory 90) occurring along with access to other data.

For example, data that is included in data (first data) to be processed by the first application (first processing) and is unable to be allocated to the first memory 20 (exceeds the capacity of the first memory 20) may be arranged in the sixth memory 90, and data that is included in data to be processed by the second application requiring higher speed than the first application and is unable to be allocated to the first memory 20 may be arranged in the second memory 30. In other words, when the first application is run, the sixth memory 90 may be used as a swap device, and when the second application requiring higher speed is run, the second memory 30 may be used as a swap device.

Figure 29:
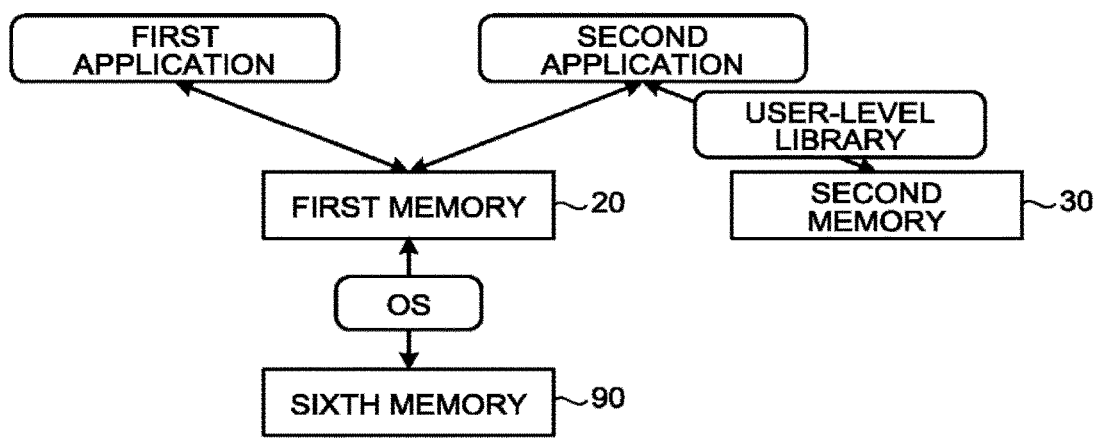
FIG. 29 is a diagram illustrating an overview of the modification.

In this case, as illustrated in FIG. 29, the OS (moving processing controller 160) can perform control to execute swapping occurring along with the operation of the first application (swapping between the first memory 20 and the sixth memory 90, which may be referred to as OS swapping in the following description) and, meanwhile, to allow the second application to execute swapping occurring along with the operation of the second application (swapping between the first memory 20 and the second memory 30, which may be referred to as application swapping in the following description). This control can increase the regions available to the second application in the fast second memory (NVM) 30. In the settings of the page table, when the storage location is the sixth memory 90, the OS handles data move (swapping) or a page fault detecting that data move is necessary (the user level information indicating "No" is set), and when the storage location is the second memory 30, the application handles data move (swapping) or a page fault detecting that data move is necessary (the user level information indicating "Yes" is set).

Figure 30:
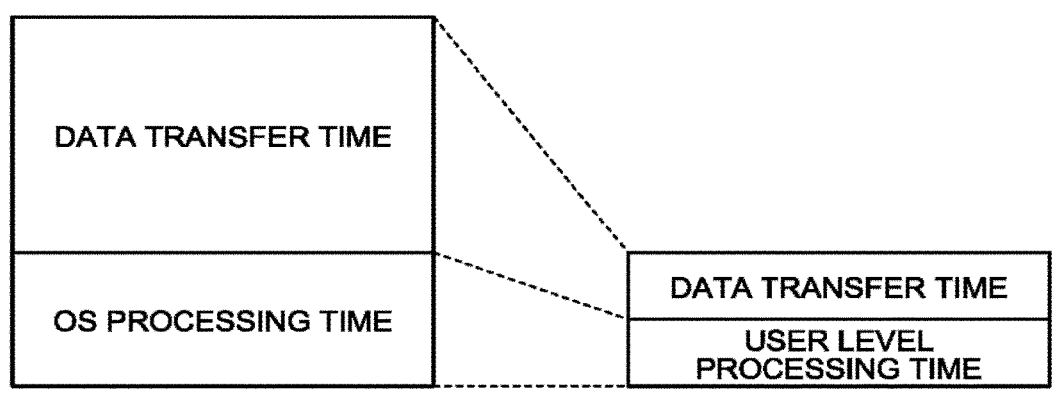
FIG. 30 is a diagram illustrating the effects of the sixth embodiment.

As illustrated in FIG. 30, when swapping is performed at the user level, the data transfer time is reduced by using the second memory 30 such as a fast NVM instead of the sixth memory 90 such as HDD or SSD. In addition, higher speed can be achieved by replacing the processing by the OS with the user level processing (the processing of the user level library or the processing at the application level). In this example, the swapping overhead can be thought to include the data transfer time and the user level processing time indicating the time required for the user level processing. If the user level processing reduces the OS processing time but does not eliminate it, the swapping overhead can be thought to include the data transfer time, the user level processing time, and the OS processing time. The user-level swapping (including the swapping overhead newly defined here) is applicable to all of the foregoing embodiments.

More specifically, the swapping overhead is information indicating the time required for swapping occurring multiple times in a certain period in a period for the processor 10 to execute the first processing of processing the first data having a size larger than one or more active regions of the first memory 20 (DRAM) using the active region of the first memory 20, the second memory 30, and the sixth memory 90 as working memory and is the sum of the cumulative value of the OS swapping overhead indicating the time required for swapping by the OS and the cumulative value of the application swapping overhead indicating the time required for swapping by the application. The OS swapping overhead per swapping is the sum of the OS processing time and the data transfer time indicating the time required for data transfer between the first memory 20 and the sixth memory 90. The application swapping overhead per swapping is the sum of the application processing time indicating the time required for the processing executed by the application in connection with swapping and the data transfer time indicating the time required for data transfer between the first memory 20 and the second memory 30. The OS then determines that the required performance is satisfied when the swapping overhead that is the sum of the OS swapping overhead and the application swapping overhead is equal to or smaller than a threshold.

In short, the information processing apparatus 1 includes a processor 10, a first memory 20, a second memory 30, and a sixth memory 90 with an access speed, indicating the speed taken for data read/write, lower than that of the second memory 30. The processor 10 executes the first processing of processing the first data having a size larger than one or more active regions of the first memory 20. The second memory 30 stores therein data that is part of the first data and requires fast processing. The sixth memory 90 stores therein data that is part of the first data and does not require fast processing. The OS (region controller 110) running on the processor 10 changes the number of active regions such that the sum of the processing information indicating the amount of processing of application swapping occurring in a certain period in a period for executing the first processing using an active region of the first memory 20, the second memory 30, and the sixth memory 90 as working regions (the cumulative value of application swapping overhead in a certain period) and the processing information indicating the amount of processing of OS swapping occurring in the certain period (the cumulative value of OS swapping overhead in a certain period) is equal to or smaller than a threshold. The OS executes the OS swapping and meanwhile allows the application corresponding to the first processing to execute the application swapping. The application swapping is the processing for moving second data indicating data stored in the first memory 20 to the second memory 30 and moving third data indicating data stored in the second memory 30 to the first memory 20. The OS swapping is the processing for moving thirteenth data indicating data stored in the first memory 20 to the sixth memory 90 and moving fourteenth data indicating data stored in the sixth memory 90 to the first memory 20.

If the OS is committed to all of swapping processes, the OS processing time (the overhead of the OS in connection with swapping) increases, because it is difficult to perform page move in accordance with the memory access characteristic of each individual application, such as moving a plurality of consecutive pages collectively to the first memory 20 or purging a page presumably presumed to be unnecessary to the swap space using an algorithm such as LRU, and therefore the OS may move a necessary page to the first memory 20 every time as needed, or move an unnecessary page to the first memory 20, or purge a page to be accessed soon to the swap space.

In view of the above, in the present embodiment, swapping is performed at the user level (application level) to allow necessary pages alone to be moved at a time, thereby reducing unnecessary page moves and the number of times of swapping, and reducing the OS processing time. Since reducing the OS processing time can reduce the swapping overhead, the number of active regions of the first memory 20 (the active capacity of the first memory 20) can be reduced accordingly, thereby achieving further power saving.

A description will be given using the example in FIG. 26. For example, when the OS receiving a request from the application accesses the page corresponding to the page number indicating "0", a page fault occurs, and swapping is entrusted to the application in accordance with the settings in the page table. When the settings are such that the OS is committed to this swapping to transfer pages of consecutive addresses, the page corresponding to the page number indicating "1" is transferred together with the page corresponding to the page number indicating "0". However, when on the application side, the page to be used after the page 0 corresponding to the page number indicating "0" is the page corresponding to the page number indicating "4", the transfer of the page corresponding to the page number indicating "1" is in vain.

Figure 31:
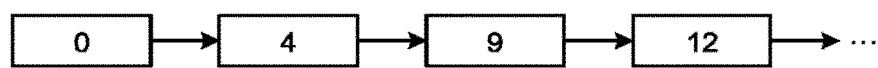
FIG. 31 is a diagram illustrating a list of page numbers in the sixth embodiment.

Then, as illustrated in FIG. 31, the present embodiment has a list of page numbers (in any format, for example, in the form of a virtual address list). In this list, the order of use of corresponding pages (the order in which pages are used) is set. A plurality of lists may be provided. If a page fault occurs and the application is entrusted with swapping, the application searches the list for the page number that has caused the page fault, and transfers pages corresponding to some or all of the page numbers to be used later than the virtual address, when transferring the page corresponding to the found page number. Doing this can reduce the number of times of page faults (the number of times of OS processing related to swapping), leading to reduction of swapping overhead. Accordingly, the number of active regions of the first memory 20 can be further reduced to achieve further power saving. Specifically, when the application moves second data stored in the first memory 20 to the second memory 30 and moves third data stored in the second memory 30 to the first memory 20 (when the application executes swapping), the third data and some or all of data to be processed later than the third data are moved to the first memory 20, based on order information (corresponding to the above-noted list) indicating the order in which a plurality of data (each data in units of pages) including the third data is processed.

When the application uses a user level library dedicated for user-level swapping for processing, an API for setting a list is provided by the user level library and is used for settings. In other words, the OS (in a different point of view, the information processing apparatus 1) has an interface (API) for the application to set the order information (corresponding to the list) indicating the order in which data is processed.

Seventh Embodiment

Figure 32:
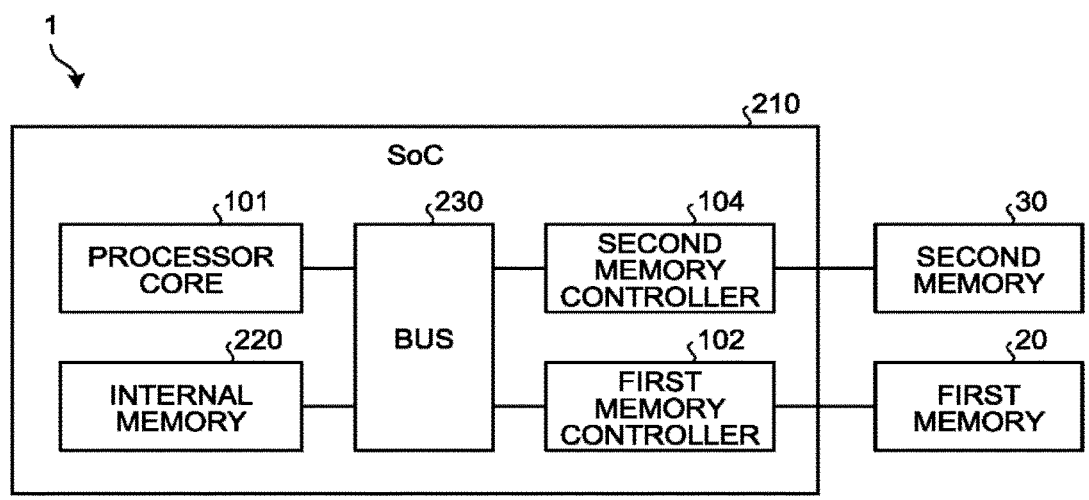
FIG. 32 is a diagram illustrating an exemplary configuration of an information processing apparatus according to a seventh embodiment.

A seventh embodiment will now be described. A description of parts in common with the foregoing first embodiment will be omitted as appropriate. FIG. 32 is a diagram illustrating an example of the hardware configuration of the information processing apparatus 1 according to the present embodiment. As illustrated in FIG. 32, the information processing apparatus 1 includes a system on chip (SoC) 210, a first memory 20 configured with, for example, DRAM, and a second memory 30 configured with, for example, NVM.

The SoC 210 includes, as internal modules, a processor core 101, a first memory controller 102, a second memory controller 104, and an internal memory 220, which are connected through a bus 230. In this example, the SoC 210 corresponds to "processing device".

In this example, the processor core 101 is, for example, an ARM processor and includes a cache memory (L1 cache, L2 cache) and a general-purpose (single instruction multiple data) engine such as NEON. The SoC 210 may be configured as a single core having one processor core 101 or may be configured as a multi-core having a plurality of processor cores (multi-core processor). The first memory 20 can suppress power consumption by shifting the whole or part of the memory to a power-saving mode such as self-refresh mode, or by power-off, in the same manner as in the foregoing first embodiment. The first memory 20 is, but not limited to, a volatile memory configured with DRAM such as LPDDR2 or may be, for example, a nonvolatile memory. The configuration of the second memory 30 is the same as the foregoing first embodiment.

The internal memory (the memory in the inside of the processing device) 220 is configured with, for example, SRAM or may be a nonvolatile memory, for example, such as a fast MRAM. Since the internal memory 220 is an on-chip-memory, the access latency is low and the power consumption is low, compared with a memory (the first memory 20 or the second memory 30) connected to the SoC 210.

Figure 33:
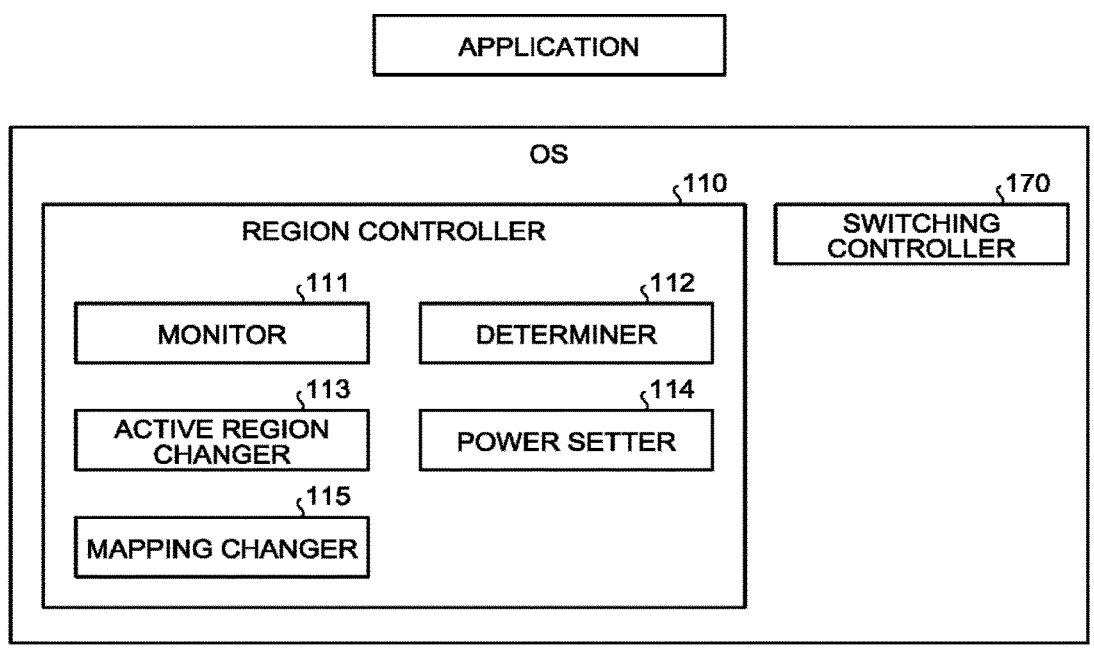
FIG. 33 is a diagram illustrating software of the information processing apparatus according to the seventh embodiment.

FIG. 33 is a diagram illustrating an example of the software configuration of the information processing apparatus 1. The present embodiment differs from the foregoing first embodiment in that the OS further includes a switching controller 170. Here, a second active region is an region in the internal memory 220 that is available for data read/write. When the processing (first processing) of the first data having a size larger than one or more active regions is switched to the processing using one or more second active regions (corresponding to the free space of the internal memory 220) instead of the first memory 20, the switching controller 170 performs control to switch the processing of the first data using the first memory 20 and the second memory 30 to the processing using the internal memory 220, if sixth processing information indicating the amount of processing for moving at least part of eleventh data indicating data stored in the second active region to the second memory 30 and moving at least part of twelfth data indicating data stored in the second memory 30 to the internal memory 220 in a certain period in a period for processing the first data (a certain period in a period for executing the first processing) is equal to or smaller than a threshold. Specifically, when the first processing is switched to the processing using the internal memory 220 (one or more second active regions) instead of the first memory 20, if the swapping overhead indicating the amount of processing of swapping occurring in a certain period in a period for executing the first processing is equal to or smaller than the threshold, control is performed to switch the first processing using the first memory 20 as a memory used for read/write of the first data by the SoC 210 (processor core 101) to the processing using the internal memory 220 (using the internal memory 220 alone) as a memory used for read/write of the first data by the SoC 210.

After this switching, the OS (region controller 110) may change the number of second active regions in the internal memory 220 in a range in which swapping overhead (for convenience of explanation, referred to as "tenth swapping overhead (corresponding to the sixth processing information)") indicating the amount of processing of swapping (for convenience of explanation referred to as "fourth swapping (corresponding to fourth moving processing)") for moving eleventh data indicating data stored in the internal memory 220 to the second memory 30 and moving twelfth data indicating data stored in the second memory 30 to the first memory 20 is equal to or smaller than the threshold. The time (overhead) required per fourth swapping is the sum of the data transfer time required for data transfer between the internal memory 220 and the second memory 30 and the OS processing time required for the processing executed by the OS in connection with the fourth swapping. The tenth swapping overhead indicates a total of overheads of one or more fourth swapping processes occurring in a certain period.

The switching controller 170 performs control to switch the first processing to the processing using the first memory 20 and the internal memory 220 in combination as the memory used for read/write of the first data by the SoC 210 (processor core 101), when the swapping overhead during execution of the first processing using the first memory 20 and the second memory 30 as working regions is equal to or smaller than the threshold and when the number of second active regions of the internal memory 220 does not match the number of active regions of the first memory 20 at that time.

Figure 34:
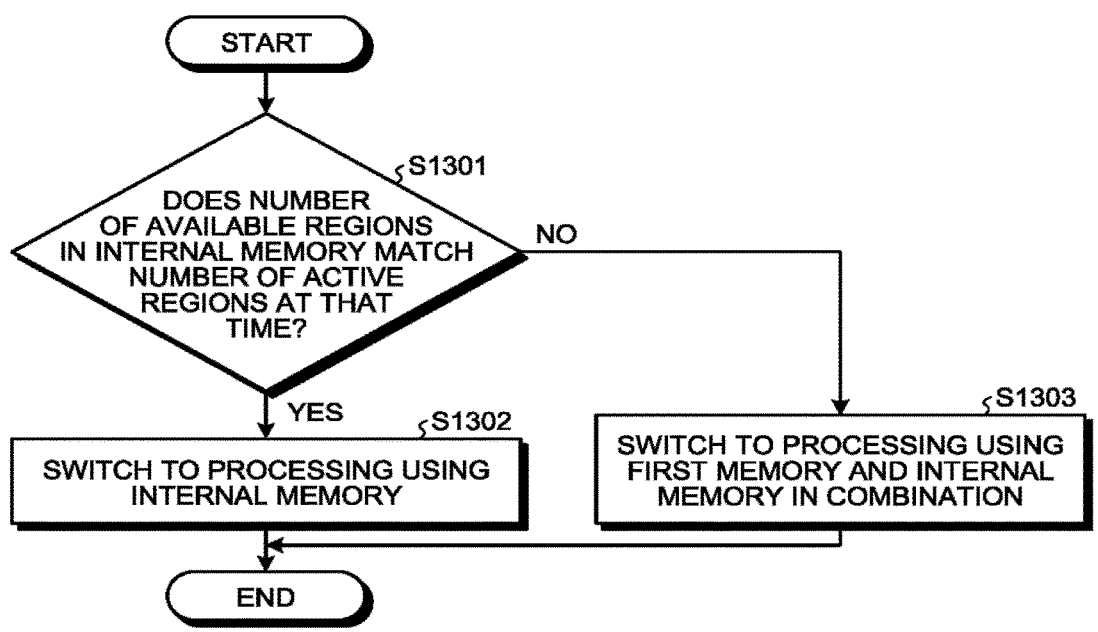
FIG. 34 is a diagram illustrating an operation example of the information processing apparatus according to the seventh embodiment.

FIG. 34 is a flowchart illustrating an operation example of the information processing apparatus 1 according to the present embodiment. In the example in FIG. 34, it is premised that the SoC 210 is executing the first processing using the first memory 20 and the second memory 30 as working regions and that the number of active regions of the first memory 20 is set such that swapping overhead is equal to or smaller than a threshold. First of all, the switching controller 170 determines whether the number of second active regions of the internal memory 220 matches the number of active regions of the first memory 20 at present (step S1301). "The number of second active regions of the internal memory 220 matches the number of active regions of the first memory 20" means that the size of the total number of second active regions of the internal memory 220 (the size of free space of the internal memory 220) is equal to or larger than the size of a total of active regions of the first memory 20 or may be equal to or larger than a predetermined size smaller than the size of a total of active regions of the first memory 20 by the amount considering the difference between the access speed of the first memory 20 and the access speed of the internal memory 220. In short, at step S1301, it is determined whether the required performance can be satisfied even when the processing using an active region of the first memory 20 and the second memory 30 as working regions is switched to the processing using a second active region of the internal memory 220 (free space of the internal memory 220) and the second memory 30 as working regions.

Figure 35:
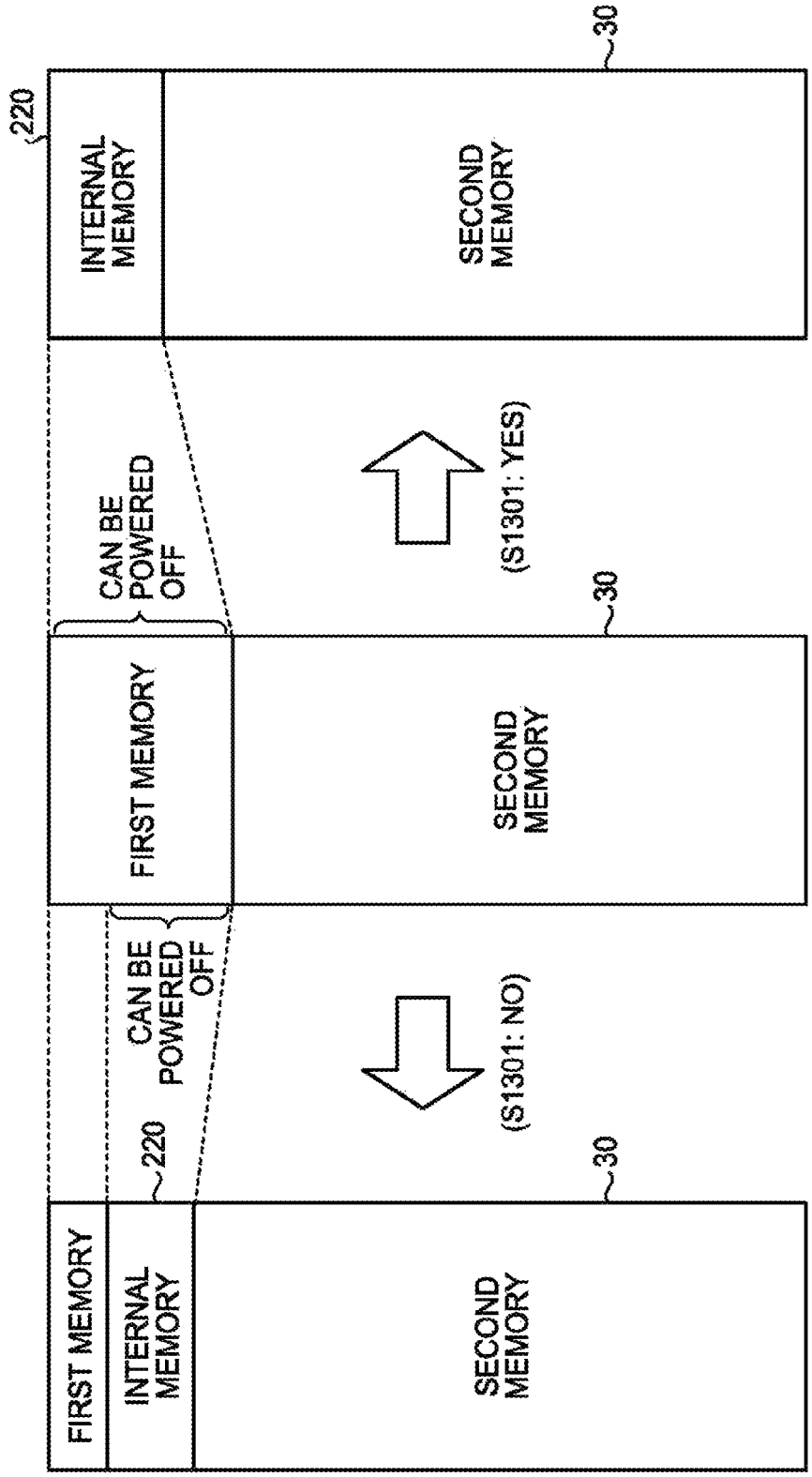
FIG. 35 is a diagram for supplemental illustration of an operation example of the information processing apparatus according to the seventh embodiment.

If the determination at S1301 is Yes (Yes at step S1301), as illustrated in FIG. 35, the switching controller 170 performs control to switch the first processing to the processing using the internal memory 220 (using the internal memory 220 alone) as the memory used for read/write of the first data by the SoC 210 (processor core 101) (step S1302). If the determination at S1301 is No (No at step S1301), as illustrated in FIG. 35, the switching controller 170 performs control to switch the first processing to the processing using the first memory 20 and the internal memory 220 in combination as the memory used for read/write of the first data by the SoC 210 (processor core 101) (step S1303).

Figure 36:
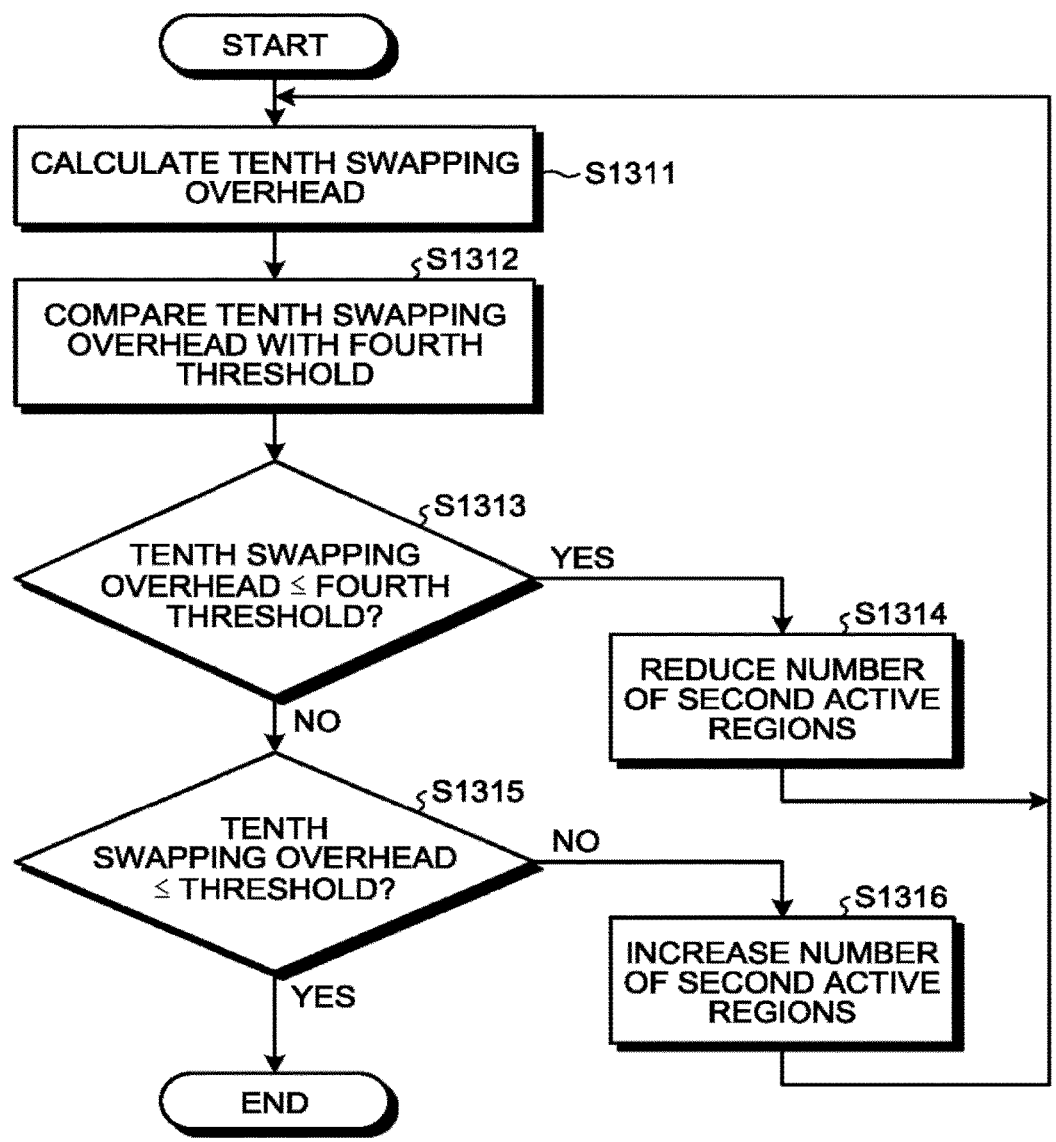
FIG. 36 is a diagram illustrating an operation example of the information processing apparatus according to the seventh embodiment.

FIG. 36 is a flowchart illustrating an operation example of the information processing apparatus 1 after step S1302 in FIG. 34. First of all, the region controller 110 calculates the tenth swapping overhead (step S1311). Next, the region controller 110 compares the tenth swapping overhead calculated at step S1311 with the fourth threshold (step S1312). If the tenth swapping overhead is equal to or smaller than the fourth threshold (Yes at step S1313), the region controller 110 performs control to reduce the number of second active regions (step S1314). The processing subsequent to step S1311 then repeats.

On the other hand, if the tenth swapping overhead calculated at step S1311 is greater than the fourth threshold (No at step S1313), the region controller 110 determines whether the tenth swapping overhead is equal to or smaller than the aforementioned threshold (step S1315). If the determination at step S1315 is Yes (Yes at step S1315), the processing ends. If the determination at S1315 is No (No at step S1315), the region controller 110 performs control to increase the number of second active regions (step S1316), and the processing subsequent to step S1311 repeats. At step S1316, if the number of second active regions is unable to be increased, which is synonymous with that the determination at step S1301 in FIG. 34 is No, the processing proceeds to step S1303 in FIG. 34.

The switching at step S1302 in FIG. 34 can be performed at various timings. For example, the switching may be performed during execution of the application. Alternatively, an active region of the first memory 20 and the second memory 30 may be used as working regions during initial execution of the application, and when the application is executed next time, a second active region of the internal memory 220 and the second memory 30 may be used as working regions by reflecting the result of the initial execution of the application. An alternative setting may be such that both are executed, for example, during installation of the application, and the application is set to run by the method with the lower power consumption or with the shorter execution time. This is applicable to all other embodiments. Although the foregoing description is premised on that the virtual memory scheme is used, embodiments are not limited to this.

Modification to Seventh Embodiment

Figure 37:
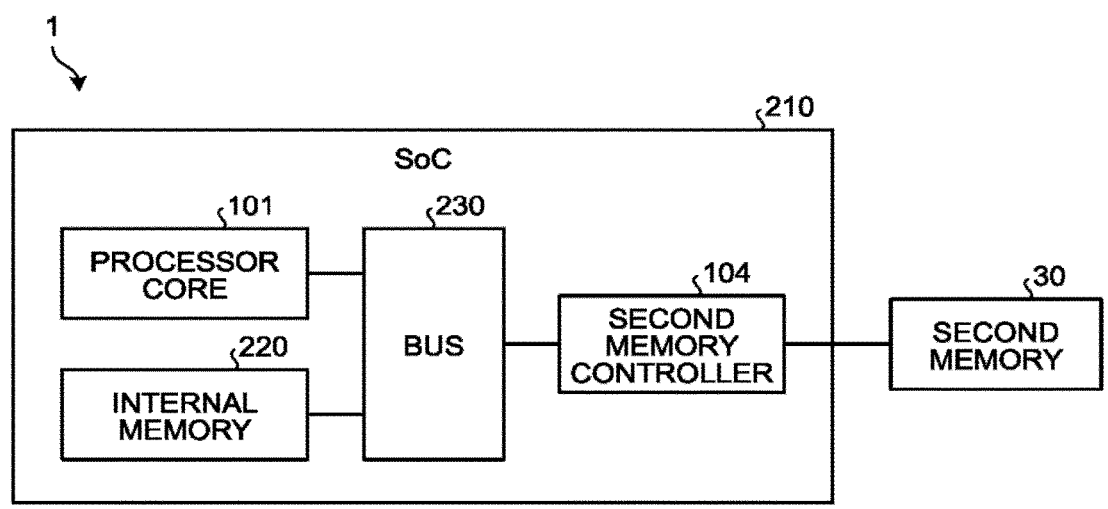
FIG. 37 is a diagram illustrating an exemplary configuration of an information processing apparatus according to a modification.

For example, as illustrated in FIG. 37, the first memory 20 may not be provided. In such a system, the power saving control for the first memory 20 as described in the foregoing first embodiment may be replaced with power saving control for the internal memory 220. More specifically, the information processing apparatus 1 includes an SoC 210 executing the first processing of processing the first data, an internal memory 220 that is used for read/write of the first data by the SoC 210 and indicates the memory in the inside of the SoC 210, and a second memory 30 storing therein part of the first data. The OS running on the SoC 210 may have the function (region controller 110) of changing the number of second active regions such that sixth processing information (tenth swapping overhead) indicating the amount of processing (the amount of processing of the fourth moving processing (fourth swapping)) for moving at least part of the eleventh data indicating data stored in the internal memory 220 to the second memory 30 and moving at least part of the twelfth data indicating data stored in the second memory 30 to the internal memory 220 is equal to or smaller than a threshold, in a certain period in a period for processing the first data having a size larger than one or more second active regions.

Conversely to the example described above, the processing using the internal memory 220 and the second memory 30 as working regions may be switched to the processing additionally using the first memory 20. More specifically, the information processing apparatus 1 includes an SoC 210, a first memory 20, an internal memory 220, and a second memory 30. The OS running on the information processing apparatus 1 may have the function of performing control to switch the first processing to the processing using the first memory 20 and the internal memory 220 in combination as the memory used for read/write of the first data by the SoC 210, if the sixth processing information (tenth swapping overhead) indicating the amount of processing (the amount of processing of the fourth swapping) for moving at least part of the eleventh data indicating data stored in the internal memory 220 to the second memory 30 and moving at least part of the twelfth data indicating data stored in the second memory 30 to the first memory 20 exceeds a threshold, in a certain period in a period for processing the first data having a size larger than one or more second active regions using one or more second active regions indicating the regions in the internal memory 220 available for data read/write and the second memory 30. When this switching is performed, power supplied to any one or more (any number that can satisfy the required performance) of the regions (power supply unit regions) included in the first memory 20 is changed from the second power to the first power, and the inactive region changes to an active region.

Eighth Embodiment

Figure 38:
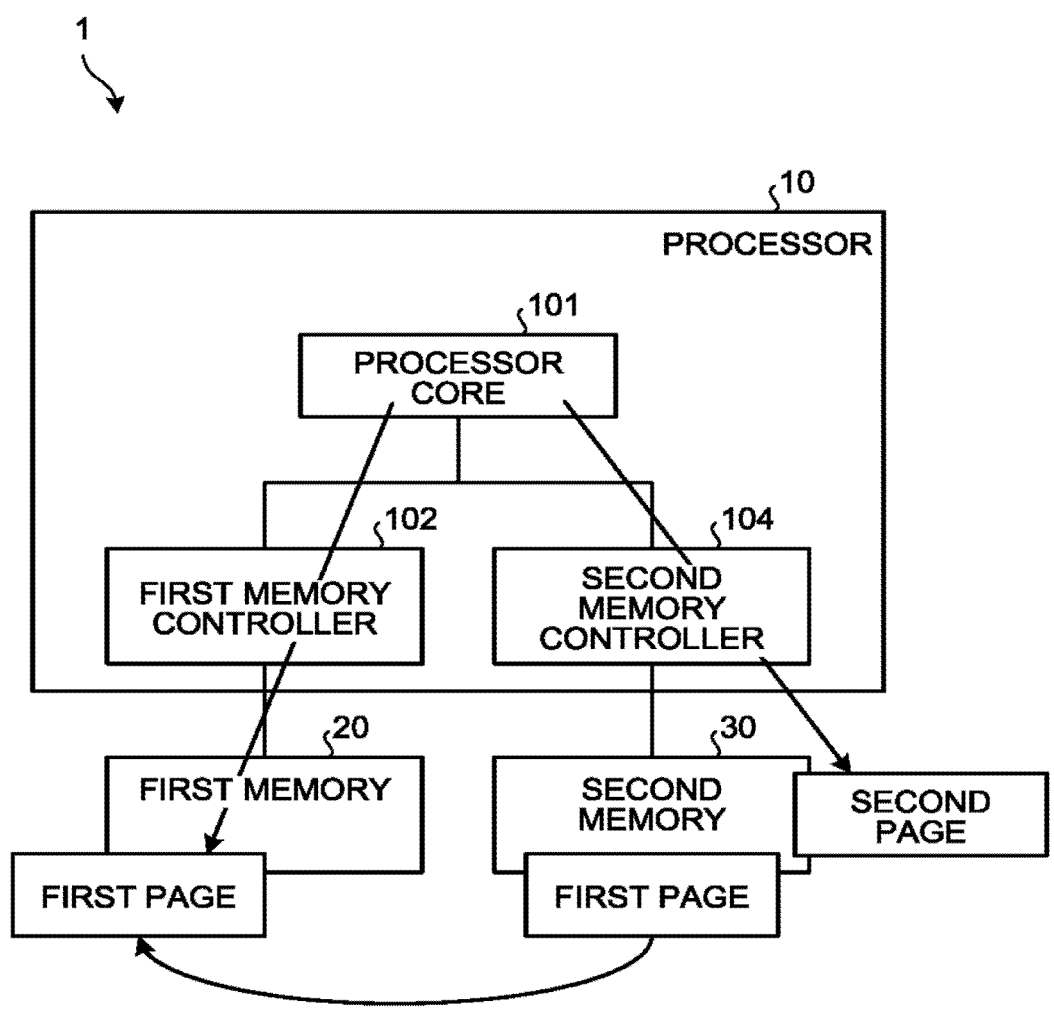
FIG. 38 is a diagram illustrating an exemplary configuration of an information processing apparatus according to an eighth embodiment.

An eighth embodiment will now be described. A description of parts in common with the foregoing first embodiment will be omitted as appropriate. FIG. 38 is a diagram illustrating an example of the hardware configuration of the information processing apparatus 1 according to the present embodiment. In the example in FIG. 38, the processor 10 is connected with each of the first memory 20 such as DRAM and the second memory 30 such as NVM. The second memory 30 is supposed to be a nonvolatile memory, such as MRAM, 3D XPoint, or ReRAM, on which the processor 10 can directly read/write (can access) data in units of bytes or in units of cache lines of the processor (in units smaller than units of pages of the OS) as illustrated in the first embodiment.

The OS running on the processor 10 has the function (first means) performing read/write of a page through swapping (performing read/write by transferring a target page on the second memory 30 to the first memory 20), if the target page indicating a page requested for read/write exists on the second memory 30 and the number of times of use of the page (the number of times of use in a certain period shorter than the processing period for executing the processing) is equal to or greater than a reference value (if access locality is high). The OS also has the function (second means) directly performing data read/write on the second memory 30 if the target page exists on the second memory 30 and the number of times of use of the page is smaller than the reference value (if access locality is low).

The second page illustrated in FIG. 38 is a page with low access locality. When the target page is the second page, the processor 10 directly reads/writes the target page on the second memory 30, based on the page table settings made by the OS. More specifically, the OS directly performs read/ write for the page data requested for read/write, of a plurality of page data included in the second page. Data (page data) included in each page is of any structure and size and may be the same or different among page data. The first page illustrated in FIG. 38 is a page with high access locality. When the target page is the first page, the processor 10 reads/writes the target page through swapping, based on the page table settings made by the OS.

For example, assume that when the target page requested for read/write exists on the second memory 30 and the access locality of the target page is low, the target page is accessed after being transferred to the first memory 20 by the first means. In this case, if the page is used less frequently, the transfer in units of pages wastes most of the time and power required for the data transfer and therefore is inefficient. Instead, by causing a second means to directly access data in units smaller than pages, such as in units of cache lines, the waste as described above can be suppressed, in spite of the slower access speed of the second memory 30 than the first memory 20. On the other hand, if the target page exists on the second memory 30 and the access locality of the target page is high, accessing through swapping is more efficient, because data read/write is performed on the first memory 20 allowing fast access to the target page. In this way, the first access and the second access are mixed depending on the pattern of access to data (for example, when the access locality of the target page is low), thereby suppressing unnecessary page-in, page-out of a page that is unnecessarily paged in, and page-out of a page that should be stored in another first memory 20 (for immediate use) due to unnecessary page-in. This configuration can reduce the amount of data move (enable efficient use of the first memory 20) and can reduce the necessary capacity of the first memory 20 (the performance can be kept with a small capacity). The region of the first memory 20 that becomes unnecessary because of the reduced capacity can be powered off. Accordingly, power saving can be achieved.

Here, the first data includes one or more pieces of sixth data indicating data to be directly read/written on the second memory 30 and one or more pieces of seventh data indicating data to be read/written through swapping. In this case, since the seventh data solely uses the first memory 20, the OS (region controller 110) can determine the number of active regions (determine before the first processing) in accordance with the number of pieces of seventh data. More specifically, the number of active regions can be determined such that the total size of the active regions of the first memory 20 is equal to or smaller than the total size of the seventh data. Power supplied to an active region is set to the first power, and power supplied to other inactive regions is set to the second power, in the same manner as in the foregoing first embodiment. After the default number of active regions is determined, the operation is the same as in the foregoing first embodiment.

When the case where the processor 10 executes the fourth processing (fourth application) of processing data including more pieces of data to be read/written through swapping is compared with the case where the processor 10 executes the fifth processing (fifth application) of processing data including more pieces of data directly read/written on the second memory 30 than in the fourth processing, the number of active regions is larger in the case of executing the fourth processing.

In this example, the number of pieces of seventh data used when the default number of active regions is determined can be specified based on the hint information provided to the OS by the application. The hint information is information indicating the access characteristic of each data included in the data (first data) to be processed by the application (information indicating how each data is accessed) and may be in any format. For example, the hint information may be information indicating whether each of a plurality of pieces of data included in the first data is the sixth data or the seventh data, or may be information by which the OS can determine whether each of a plurality of pieces of data included in the first data is the sixth data or the seventh data. For example, the hint information may be information indicating whether each of a plurality of pieces of data included in the first data is data randomly accessed. The OS can determine that the data randomly accessed is the sixth data.

In short, the OS can receive hint information indicating the access characteristic of each data included in the first data indicating data to be processed in the first processing, from the application corresponding to the first processing before execution of the first processing, and specify the number of pieces of seventh data based on the received hint information.

Figure 39:
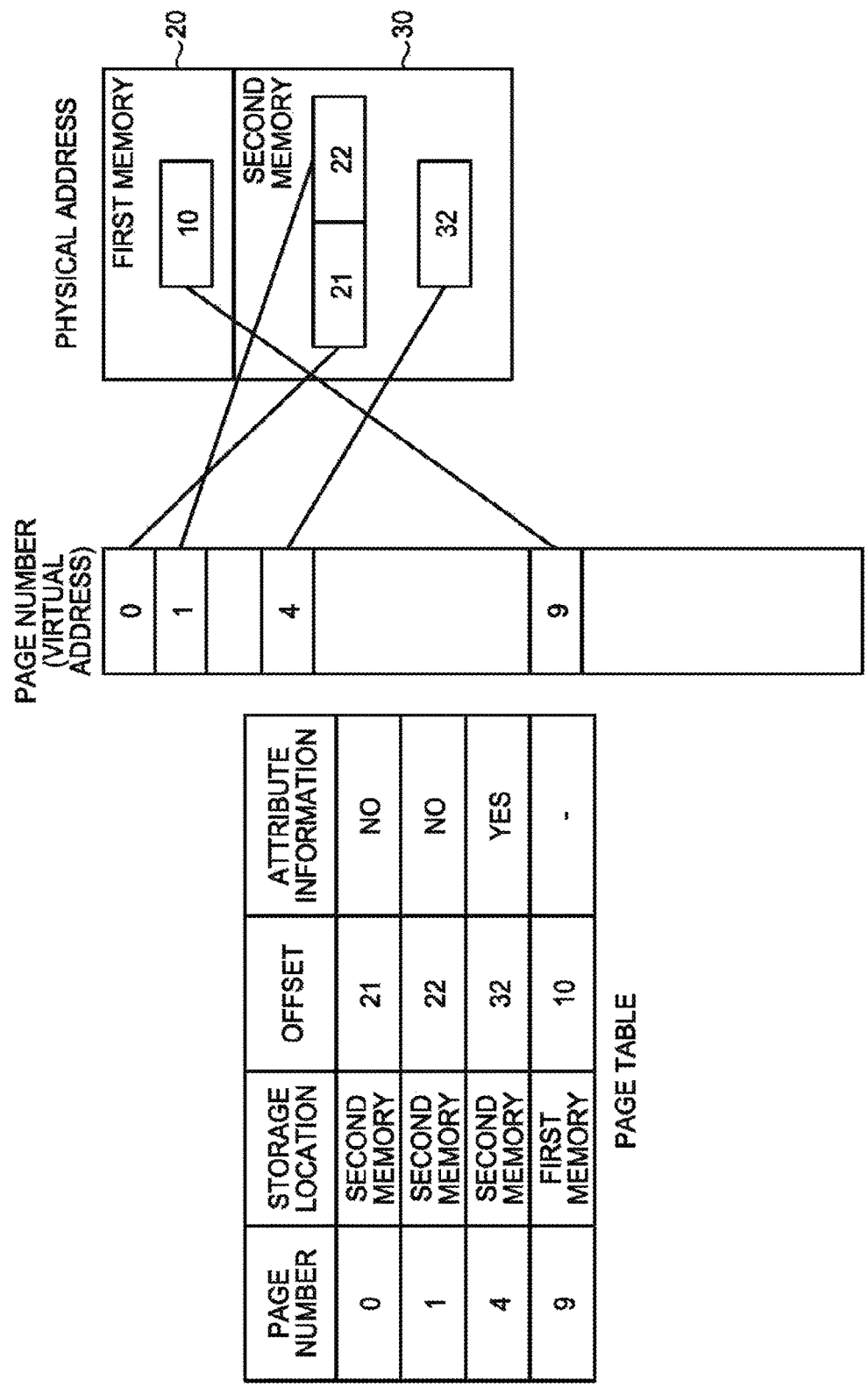
FIG. 39 is a diagram illustrating a page table in the eighth embodiment.

As another method, the OS can know the number of pieces of seventh data based on information recorded in a page table as illustrated in FIG. 39. In the example in FIG. 39, only the parts necessary for description of the present embodiment are illustrated. This is the same with an example of the page table in other embodiments. As illustrated in FIG. 39, the page table is information in which a storage location, an offset, and attribute information indicating whether it is the sixth data or not are associated with each other, for each of a plurality of pages (page associated with the virtual address allocated to the data to be processed). In the example in FIG. 39, the attribute information indicating "No" is information indicating that it is the seventh data (information indicating that it is not the sixth data), and the attribute information indicating "Yes" is information indicating that it is the sixth data. In short, the page table (correspondence information) can be considered as information in which each of a plurality of pieces of data included in the first data is associated with the attribute information indicating whether the data is the sixth data. The OS (region controller 110) can specify the number of pieces of seventh data included in the first data, based on this page table. The method to know the number of pieces of seventh data is not limited to those described above.

Figure 40:
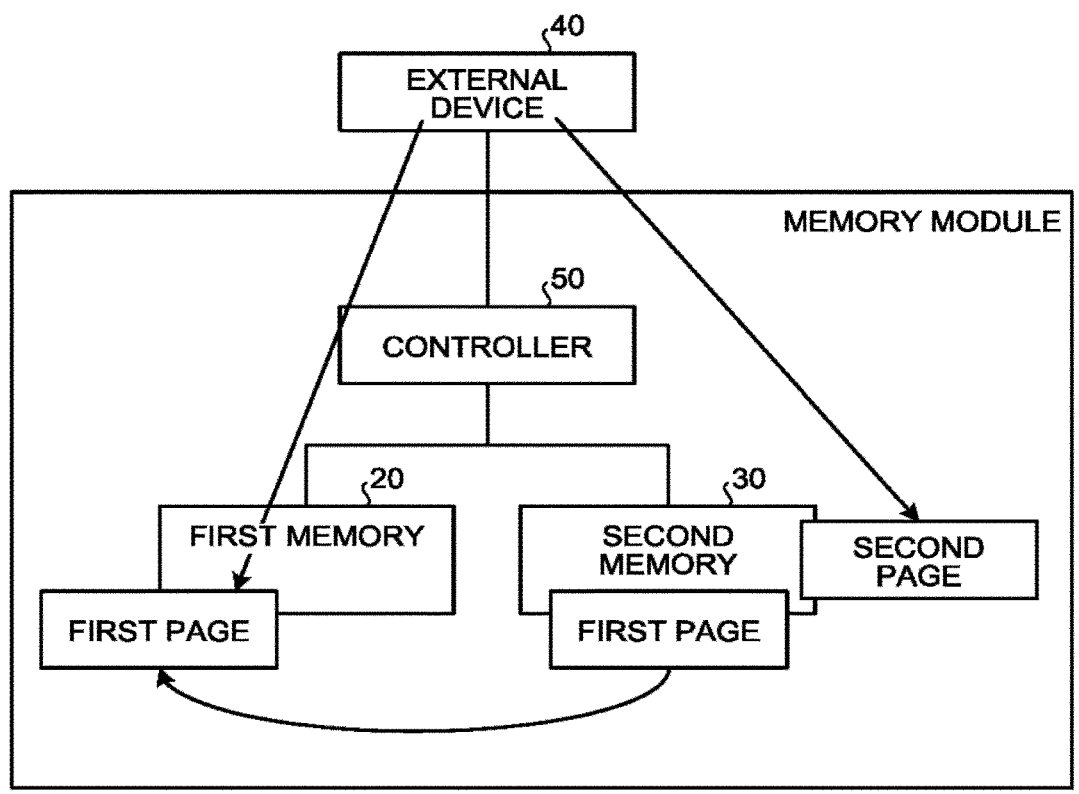
FIG. 40 is a diagram illustrating an exemplary configuration of an information processing apparatus according to a modification.

For example, as illustrated in FIG. 40, a storage device (memory module) may be provided, which includes a first memory 20 used for read/write of the first data by an external device 40 executing the first processing of processing the first data, a second memory 30 on which the external device 40 can directly perform data read/write and that stores therein part of the first data, and a controller 50 for moving data between the first memory 20 and the second memory 30. In this example, the function provided by the OS (the function such as the region controller 110) is implemented by controller 50 that is a hardware element. In such a configuration, the controller 50 controls whether read/write of a target page requested for read/write is performed directly on the second memory 30 or through swapping. The controller 50 may manage the page table, specify the number of pieces of seventh data based on the page table, and determine the default number of active regions in accordance with the specified number of pieces of seventh data. The controller 50, which can receive the hint information from the application running on the external device 40 such as a CPU, may specify the number of pieces of seventh data based on this hint information and determine the default number of active regions based on the specified number of pieces of seventh data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a processing device configured to process first data;
a first memory configured to store at least part of the first data, the first memory having a plurality of power supply unit regions that serve as units of power supply, the power supply unit regions having one or more active regions each supplied with a first power that is necessary for at least holding content of data;
a second memory configured to store part of the first data; and
a region controller configured to change a number of the active regions such that first processing information is equal to or smaller than a first threshold, the first processing information indicating information corresponding to an amount of first processing for moving at least part of second data indicating data stored in the first memory to the second memory and for moving at least part of third data indicating data stored in the second memory to the first memory, in a certain period that is a part of a period for processing the first data having a size larger than at least one of the active regions.

2. The apparatus according to claim 1, wherein a power for holding data in the second memory is lower than a power for holding data in the first memory.

3. The apparatus according to claim 1, wherein
the power supply unit regions in the first memory have an inactive region supplied with a second power, and
the second power is lower than the first power.

4. The apparatus according to claim 1, wherein the region controller performs control
to increase the amount of the first processing such that the first processing information is equal to or smaller than the first threshold, thereby reducing number of active regions necessary for processing the first data, and
to change the first power supplied to any one of the active regions to a second power that is lower than the first power.

5. The apparatus according to claim 1, wherein
the first threshold represents an amount of electric power reduced when the number of the active regions is reduced by changing the first power supplied to any one of the active regions to a second power that is lower than the first power in the certain period,
the first processing information indicates an amount of electric power used along with the amount of the first processing increased in the certain period when the number of the active regions is reduced, and
the region controller repeatedly executes control to change the first power supplied to any one of the active regions to the second power such that the first processing information is equal to or smaller than the first threshold.

6. The apparatus according to claim 1, wherein
the first processing information includes second processing information and third processing information,
the first threshold includes a second threshold and a third threshold,
the region controller repeatedly performs control to change the first power supplied to any one of the active regions to a second power that is lower than the first power such that the second processing information is equal to or smaller than the second threshold and the third processing information is equal to or smaller than the third threshold,
the second processing information represents a time required for the first processing in the certain period, and
the third processing information represents an amount of electric power used along with the amount of the first processing increased in the certain period when the number of the active regions is reduced.

7. The apparatus according to claim 1, wherein when the first processing information is equal to or smaller than a fourth threshold that is smaller than the first threshold, the region controller performs control to change the first power supplied to any one of the active regions to a second power that is smaller than the first power, thereby reducing the number of the active regions, and to move data stored in the any one active region to the second memory.

8. The apparatus according to claim 1, further comprising:
a third memory with an access speed that is lower than that of the second memory, the access speed indicating a data read/write speed;
a calculator configured to calculate fourth processing information indicating an amount of second processing for moving at least part of the second data from the first memory to the third memory and for moving at least part of the third data from the third memory to the first memory, based on the first processing information; and
a switching controller configured to perform control to switch the first processing to the second processing when the fourth processing information is equal to or smaller than the first threshold.

9. The apparatus according to claim 1, wherein
the region controller performs control to reduce the number of the active regions when the first processing information is equal to or smaller than a fourth threshold, and
the fourth threshold is smaller than the first threshold.

10. The apparatus according to claim 9, wherein
the power supply unit regions in the first memory have an inactive region supplied with a second power that is lower than the first power,
each of the power supply unit regions has a priority, and
when the first processing information is smaller than the fourth threshold, the region controller performs control to
select an active region from the active regions based on the priority, and
set the first power supplied to the selected active region to the second power, thereby changing the selected active region to an inactive region.

11. The apparatus according to claim 1, further comprising a frequency controller configured to perform control to change a clock frequency for operating the first memory such that the first processing information does not exceed the first threshold.

12. The apparatus according to claim 1, further comprising a moving processing controller configured to perform control to execute the first processing when an application requests read/write of fourth data indicating data included in the first data, and cause the application to execute the first processing when the application requests read/write of fifth data that is included in the first data and requires faster processing than with the fourth data.

13. The apparatus according to claim 1, wherein
the first data includes
one or more pieces of sixth data indicating data to be directly read/written on the second memory, and
one or more pieces of seventh data indicating data to be read/written through the first processing, and
the region controller determines the number of the active regions in accordance with number of the pieces of the seventh data.

14. A non-transitory computer-readable medium storing instructions that, when executed by a computer, cause the computer to:
perform region control to change number of one or more active regions such that first processing information is equal to or smaller than a first threshold, the first processing information indicating information corresponding to an amount of first processing for moving at least part of second data indicating data stored in a first memory configured to store at least part of first data processed by a processing apparatus to a second memory configured to store part of the first data and for moving at least part of third data indicating data stored in the second memory to the first memory, in a certain period that is a part of a period for processing the first data having a size larger than at least one of the active regions, wherein
the first memory has a plurality of power supply unit regions that serve as units of power supply, the power supply unit regions having the active regions each supplied with a first power that is necessary for at least holding content of data.

15. The non-transitory computer-readable medium according to claim 14, wherein a power for holding data in the second memory is lower than a power for holding data in the first memory.

16. The non-transitory computer-readable medium product according to claim 14, wherein
the power supply unit regions in the first memory have an inactive region supplied with a second power, and
the second power is lower than the first power.

17. The non-transitory computer-readable medium product according to claim 14, wherein the region control includes
increasing the amount of the first processing such that the first processing information is equal to or smaller than the first threshold, thereby reducing number of active regions necessary for processing the first data, and
changing the first power supplied to any one of the active regions to a second power that is lower than the first power.

18. The non-transitory computer-readable medium according to claim 14, wherein
the first threshold represents the amount of electric power reduced when the number of the active regions is reduced by changing the first power supplied to any one of the active regions to a second power that is lower than the first power in the certain period,
the first processing information indicates an amount of electric power used along with the amount of the first processing increased in the certain period when the number of the active regions is reduced, and
the region control includes repeatedly executing control to change the first power supplied to any one of the active regions to the second power such that the first processing information is equal to or smaller than the first threshold.

19. The non-transitory computer-readable medium product according to claim 14, wherein
the first processing information includes second processing information and third processing information,
the first threshold includes a second threshold and a third threshold,
the region control includes repeatedly performing control to change the first power supplied to any one of the active regions to a second power such that the second processing information is equal to or smaller than the second threshold and the third processing information is equal to or smaller than the third threshold,
the second processing information represents a time required for the first processing in the certain period, and
the third processing information represents an amount of electric power used along with the amount of the first processing increased in the certain period when the number of the active regions is reduced.

20. The non-transitory computer-readable medium according to claim 14, wherein when the first processing information is equal to or smaller than a fourth threshold that is smaller than the first threshold, the region controller performs control to change the first power supplied to any one of the active regions to a second power that is smaller than the first power, thereby reducing the number of the active regions, and to move data stored in the any one active region to the second memory.

21. The non-transitory computer-readable medium according to claim 14, wherein the instructions further cause the computer to:
calculate fourth processing information indicating an amount of second processing for moving at least part of the second data from the first memory to a third memory with an access speed that is lower than that of the second memory and for moving at least part of the third data stored in the third memory to the first memory, based on the first processing information, the access speed indicating a data read/write speed; and
perform control to switch the first processing to the second processing when the fourth processing information is smaller than the first threshold.

22. The non-transitory computer-readable medium according to claim 14, wherein
the region control includes performing control to reduce the number of the active regions when the first processing information is equal to or smaller than a fourth threshold, and
the fourth threshold is smaller than the first threshold.

23. The non-transitory computer-readable medium according to claim 22, wherein
the power supply unit regions in the first memory have an inactive region supplied with a second power that is lower than the first power,
each of the power supply unit regions in the first memory has a priority, and
when the first processing information is smaller than the fourth threshold, the region control includes performing control to select an active region from the active regions based on the priority, and set the first power supplied to the selected active region to the second power, thereby changing the selected active region to an inactive region.

24. The non-transitory computer-readable medium according to claim 14, wherein the instructions further cause the computer to perform control to change a clock frequency for operating the first memory such that the first processing information does not exceed the first threshold.

25. The non-transitory computer-readable medium according to claim 14, wherein the instructions further cause the computer to perform control to execute the first processing when an application requests read/write of fourth data included in the first data, and cause the application to execute the first processing when the application requests read/write of fifth data included in the first data and requiring faster processing than with the fourth data.

26. The non-transitory computer-readable medium according to claim 14, wherein the first data includes one or more pieces of sixth data indicating data to be directly read/written on the second memory, and one or more pieces of seventh data indicating data to be read/written through the first processing, and the region control includes determining the number of the active regions in accordance with number of the pieces of the seventh data.

* * * * *